(12) United States Patent
Väre

(10) Patent No.: US 7,369,861 B2
(45) Date of Patent: May 6, 2008

(54) METHODS AND APPARATUS FOR SHARING CELL COVERAGE INFORMATION

(75) Inventor: Jani Väre, Kaarina (FI)

(73) Assignee: Nokia Corporation, Espoo (FI)

( * ) Notice: Subject to any disclaimer, the term of this patent is extended or adjusted under 35 U.S.C. 154(b) by 114 days.

(21) Appl. No.: 11/064,934

(22) Filed: Feb. 25, 2005

(65) Prior Publication Data

US 2005/0192031 A1  Sep. 1, 2005

Related U.S. Application Data

(60) Provisional application No. 60/548,735, filed on Feb. 27, 2004.

(51) Int. Cl.
*H04Q 7/20* (2006.01)

(52) U.S. Cl. .................. 455/456.2; 455/456.6; 455/457; 455/446; 455/440; 455/437; 455/414.1

(58) Field of Classification Search ............ 455/456.6, 455/414.2, 414.3, 440, 456.3, 457, 437, 446
See application file for complete search history.

(56) References Cited

U.S. PATENT DOCUMENTS

| | | | |
|---|---|---|---|
| 5,465,289 A | | 11/1995 | Kennedy |
| 5,561,841 A | * | 10/1996 | Markus ...................... 455/446 |
| 6,097,957 A | * | 8/2000 | Bonta et al. ................ 455/446 |
| 6,134,445 A | * | 10/2000 | Gould et al. ............. 455/456.3 |
| 6,230,011 B1 | | 5/2001 | Guenther et al. |
| 6,522,888 B1 | * | 2/2003 | Garceran et al. ......... 455/456.3 |
| 6,711,408 B1 | * | 3/2004 | Raith .......................... 455/440 |
| 6,941,146 B2 | * | 9/2005 | Knauerhase et al. ..... 455/456.3 |
| 2001/0041565 A1 | * | 11/2001 | Vicharelli et al. .......... 455/423 |
| 2003/0036350 A1 | * | 2/2003 | Jonsson et al. ................ 455/41 |
| 2003/0050058 A1 | * | 3/2003 | Walsh et al. ................ 455/426 |
| 2003/0119537 A1 | * | 6/2003 | Haddad ...................... 455/517 |
| 2003/0129987 A1 | * | 7/2003 | Tanay et al. ................ 455/450 |
| 2004/0203436 A1 | * | 10/2004 | Oesterling ............... 455/67.11 |
| 2004/0203890 A1 | * | 10/2004 | Karaoguz et al. ........ 455/456.1 |
| 2005/0026619 A1 | | 2/2005 | Jha |
| 2005/0043933 A1 | * | 2/2005 | Rappaport et al. ............. 703/1 |
| 2005/0054349 A1 | * | 3/2005 | Balachandran et al. .. 455/456.1 |

FOREIGN PATENT DOCUMENTS

| | | |
|---|---|---|
| DE | 196 38 798 A1 | 3/1998 |
| EP | 1 340 210 B1 | 1/2005 |

OTHER PUBLICATIONS

Jani Vare et al., "Approach for Improving Receiver Performance in Loss-free Handovers in DVB-H Networks", Globecom '04, IEEE Communication Society, pp. 3326-3331.
Final Draft ETSI EN 300 468 V1.6.1 (Jun. 2004). "Digital Video Broadcasting (DVB); Specification for Service Information (SI) in DVB systems".

* cited by examiner

*Primary Examiner*—Rafael Perez-Gutierrez
*Assistant Examiner*—Simon A Goetze
(74) *Attorney, Agent, or Firm*—Banner & Witcoff, Ltd.

(57) ABSTRACT

An apparatus and methods are provided for sharing cell coverage information among devices in a cell network. Cell coverage information includes bitmap models of signal strength to enable intelligent handover decisions. Mobile terminals are able to receive cell coverage information over a broadband unidirectional broadcast network, such as a digital video broadcast network. They are also able to receive cell coverage information from other mobile terminals via ad hoc wireless signalling. Mobile terminals are also able to store and upload raw signal measurements to a cell coverage information center.

31 Claims, 21 Drawing Sheets

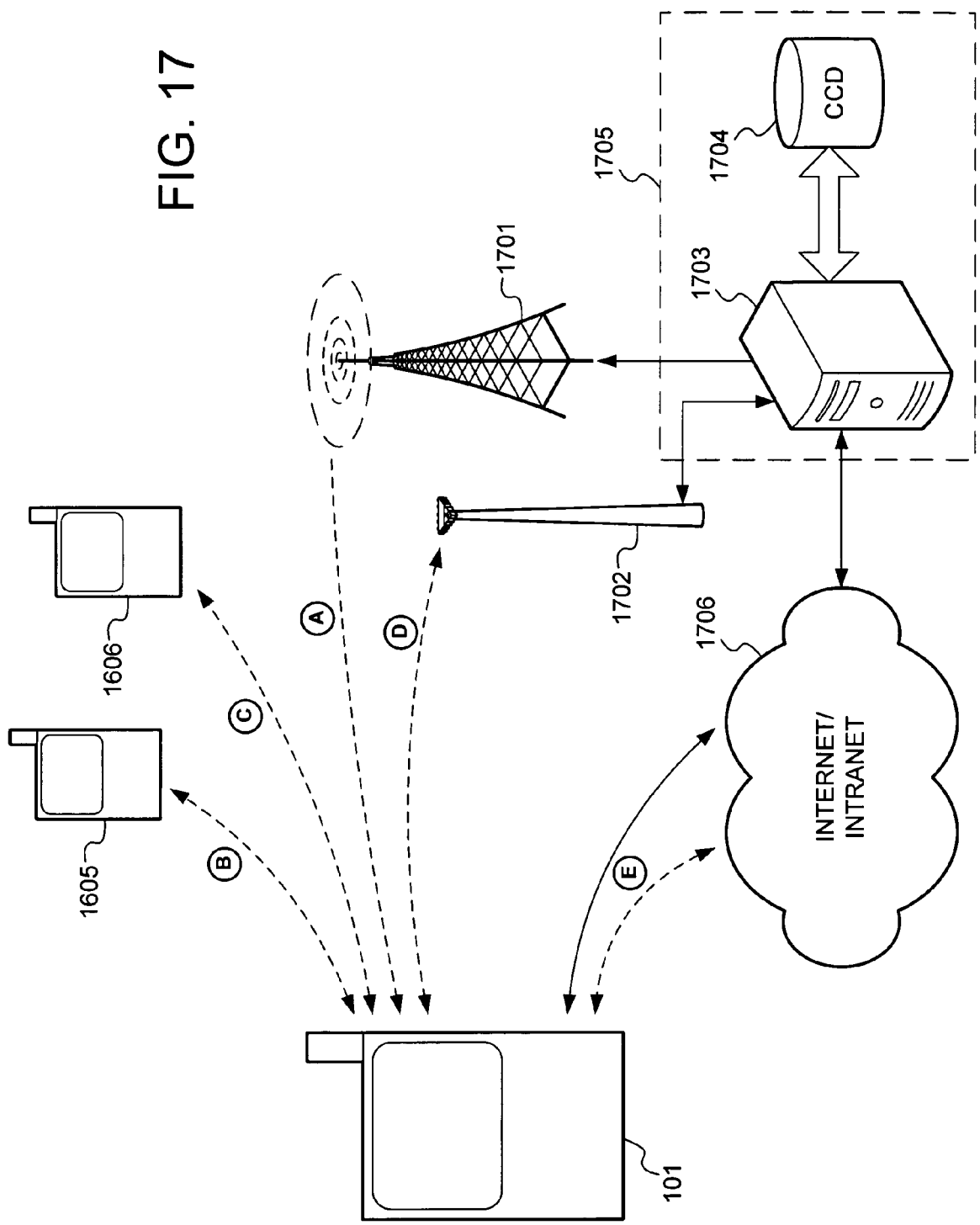

CCI Discovery or CCI Request

CCI Reply

METHODS AND APPARATUS FOR SHARING CELL COVERAGE INFORMATION

The present application claims priority to U.S. provisional application Ser. No. 60/548,735 filed on Feb. 27, 2004, the entire disclosure of which is hereby incorporated by reference.

FIELD OF THE INVENTION

The invention relates to handover procedures in wireless communications systems. More particularly, the invention provides for the mapping of cell coverage using pixels in a bitmap and for the sharing of cell coverage information.

BACKGROUND OF THE INVENTION

Handover decisions for mobile terminals traveling through a wireless network are typically made based on factors such as cell coverage, mobile terminal location and terminal movement information. Mobile terminals include a variety of electronic devices, including cellular phones, mobile digital video broadcast (DVB) receivers, pagers, personal digital assistants, laptop computers, automobile computers, portable video players, and other devices which may move among multiple cells and which include equipment for receiving signals from a wireless network. In addition to DVB receivers, mobile terminals may include mobile receivers of other digital unidirectional broadband broadcast systems.

With a first conventional approach, handover decisions are based on location, cell coverage area and terminal movement vector information. The mobile terminal has means to know its exact location (e.g., GPS, AGPS) and measure the signal strength from available signals. FIG. 1 shows a mobile terminal 101 in the crossroads of cell signals A, B, and C, each of which is depicted by a border showing the outer reaches of a single minimum signal level. The movement and velocity of mobile terminal 101 is described by vector 102. Mobile terminal 101 is able to receive any of signals A, B, and C. If mobile terminal 101 is presently receiving either signals B or C, then it executes a handover to signal A in order to continue reception of a signal in the future, assuming the same course and speed.

FIG. 2 depicts a spherical rectangle 201 representation of cell signal A as used by some technical specifications, such as the Digital Video Broadcast (DVB) system. For cell signal A, spherical rectangle has a reference corner 202, typically located at the southwest corner of the rectangle. Reference corner 202 is specified by a specific longitude and latitude, or some other geographic designation. The extent of longitude 203 and the extent of latitude 204 describe the length and height of the bounding rectangle, which is sized to encompass the cell signal. The values associated with extents 203 and 204 are in the form of degrees, minutes and seconds, or spherical or planar vectors, or some other representation having a magnitude. While permitting relatively simple handoff calculations, the use of spherical rectangles is likely to be fraught with inaccuracies.

FIG. 3 illustrates how the cell signals of FIG. 1 may be modeled using the conventional approach depicted in FIG. 2. The cells are assumed to provide the same signal strength within rectangular areas. Based on information provided to mobile terminal 101, the mobile terminal will either perform a handover to cell B, or keep the signal of cell B if already active. Given the signal strength of cell B in FIG. 1, such a determination is poor because of inaccurate cell signal representation, and a signal may be lost.

FIG. 4 presents a more realistic depiction of signal strength using different shades to represent the varying strength and weakness of a cell signal within coverage areas. Although only a few shades are used to represent signal strengths, the infinite range of signal strengths varies depending on environmental conditions within the coverage area and other factors. Under a conventional approach, mobile terminal 101 will make a poor assumption selecting cell C as a handover destination from cell B. Although cell C fully encompasses mobile terminal 101 moving along vector 102, the signal strength will decay if the mobile terminal maintains a connection to cell C. If the reception sensitivity of mobile terminal 101 were to be taken into account, the optimal choice in a handover situation would be to cell A, based on actual signal strengths. It should be noted that the Applicant is not suggesting that varying levels of signal strength have been used in conjunction with prior art handover procedures.

With a second conventional approach, handover decisions are made based on a location determination that is estimated using signal strength information and cell coverage information. With this approach, a mobile terminal is not aware of its location (e.g., doesn't have a GPS system). FIG. 5 illustrates an example of this basic method utilizing only cell shape information (i.e., only one signal level used). Here, because mobile terminal 101 is able to detect signals from both cell A and cell C, it is able to determine that it is somewhere within shaded region 501. FIG. 6 depicts a similar method to detect approximate location using spherical rectangles. Here again, because signals from both cell A and cell C are detected, mobile terminal 101 is able to determine that it is somewhere within shaded area 601. Either method, while facilitating handover decisions, do so in a highly inaccurate manner, since the precise location within the shaded region is unknown.

Therefore, there is a need in the art for handover procedures and systems that utilize accurate models of cell station signal strengths in order to expand handover procedures. In addition, there is a need for methods and systems that share cell station models and other cell coverage information.

BRIEF SUMMARY OF THE INVENTION

One or more of the above-mentioned needs in the art are satisfied by the disclosed methods and systems. Free field three dimensional models of signal levels may be created for a group of cells. In one embodiment, the models are in the form of bitmaps. A mobile terminal can determine the inner area within the cell where it is located, based on the measured signal strength and maximum signal strength value (depending on the antenna sensitivity of the receiver and calibrated 'free field' signal strength) indicated in the bitmap information. This information may be used to execute handover procedures. Aspects of the invention provide increased accuracy with respect to presenting the shape and quality of service in a cell.

Embodiments of the invention provide systems and methods for distributing, receiving and sharing cell coverage information. In aspects of some embodiments, raw cell coverage data is measured by mobile terminals, identifying minimally a geographic location and signal strength. Raw cell coverage data may be used to calculate models of cell coverage information, including bitmaps. Raw cell coverage information and/or cell coverage models may be distributed using broadcast systems, shared by other mobile terminals, downloaded from the Internet, or otherwise sent and received among electronic devices.

BRIEF DESCRIPTION OF THE DRAWINGS

The present invention is illustrated, by way of example and not limitation, in the accompanying figures in which like reference numerals indicate the same or similar elements and in which:

FIG. 17 depicts a mobile terminal in communication with a selection of devices according to one or more aspects of an embodiment of the invention;

DETAILED DESCRIPTION OF THE INVENTION

Bitmap Models of Cell Coverage

In accordance with aspects of the invention, there is provided real-life free field three-dimensional plane models of signal levels existing for a given radio cell. The models are developed in a well-defined area of adjustable size and resolution. Embodiments of the invention provide a signaling method which can be used to improve mobility in cell networks, including DVB-T/H networks. Specifically, determination and signaling of the coverage area of a cell, including the size of the cell and its location.

Figure 7B:
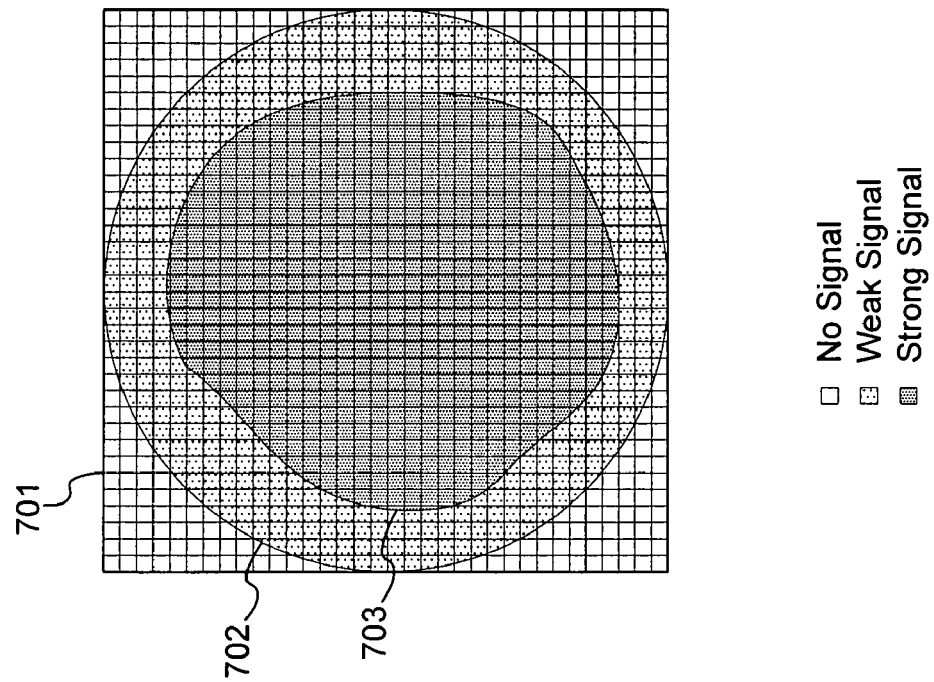
FIG. 7B shows principles for mapping a cell coverage area into a bitmap according to one or more aspects of an embodiment of the invention.
Figure 7A:
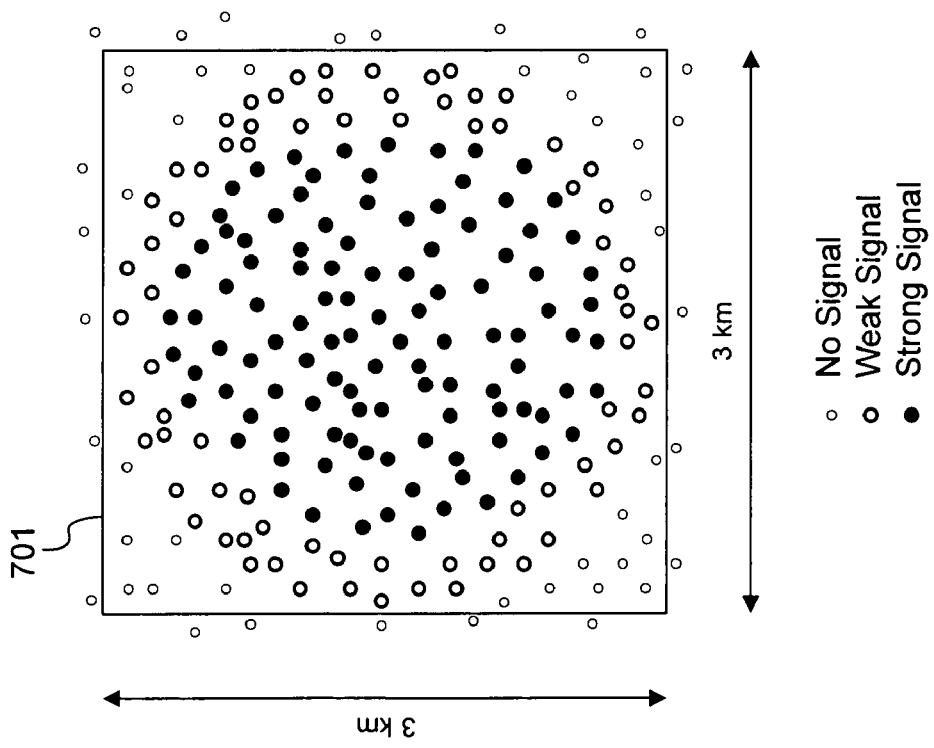
FIG. 7A shows a set of measurements of signal strength taken within a cell coverage area according to one or more aspects of an embodiment of the invention.

Bitmap models of cell coverage may be created based on measurements of signal strength taken within the area of a cell. FIG. 7A shows a set of measurements of signal strength taken within a cell coverage area 701 according to one or more aspects of an embodiment of the invention. The signal strength values may be received from one or more terminals which may be mobile or remain in a fixed location. The received strength values are analyzed, for example statistically compared to values provided by other terminals and other measurement devices. The values are recorded as geographic locations, possibly using conventional longitude and latitude, along with signal strengths, possibly measured in decibels referenced to one milliwatt (dBm).

Although the measured strength values shown in the figure are depicted as having only three signal levels (no/weak/strong), in certain embodiments the measured values may fall into a much broader range. The range of values could then be categorized using ranges. The number of ranges depends on several factors, including the desired size of the data file, the total extent of the range of values, and the need for more detailed strength measurements when making handover decisions. In the case of a bitmap data file, the number of ranges (or colors) can greatly affect the size of the file. One signal strength would require one bit per pixel (0=no signal, 1=signal). Three signal strengths would require two bits per pixel (00=no signal, 01=weak signal, 10=average signal, 11=strong signal). Additional signal strengths would require additional bits, and subsequently increase the size of a data file such as a bitmap.

Once sufficient measured values are gathered to cover a sufficient portion of a cell coverage area 701, and once the number of signal ranges is determined the process of generating a data file, such as a bitmap representation can begin. FIG. 7B depicts a step in one or more possible methods for generating a bitmap from the raw signal data.

One method involves interpolating the raw measured values into regions, similar to weak signal region 702 and strong signal region 703. This involves drawing borders based on the signal values set forth for the ranges, in an effort to encompass all similar signal strengths inside one or more contiguous regions.

Once regions are determined, a cell unit grid is effectively used to break the larger, more detailed interpolated cell coverage regions into a smaller, more manageable bitmap file. For example, as shown in FIG. 7A, if the original cell coverage area was three kilometers by three kilometers, and the final bitmap file was set to have an area of 150 pixels by 150 pixels, then each pixel would represent 400 square meters (20 m by 20 m) (calculated by 9,000,000 m$^2$/22,500 pixels). The cell unit grid does not necessarily need squares or rectangles to break down cell coverage. It may also use triangles or hexagons. When multiple regions intersect a particular cell unit, the pixel value may be decided by determining which region predominates within the cell unit.

Figure 8A:
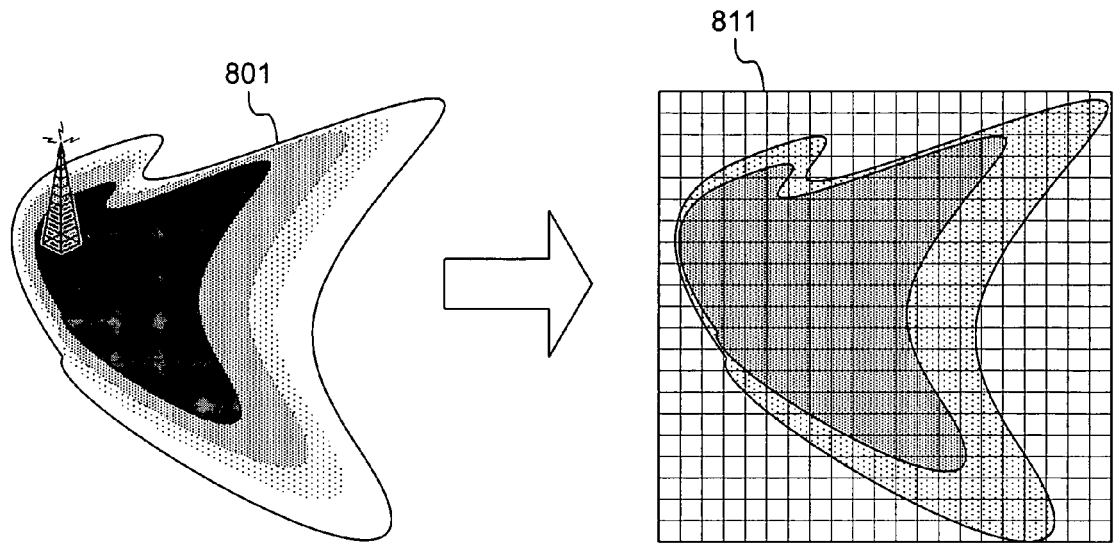
FIGS. 8A and 8B show examples of mapping differently shaped signal coverage areas into bitmaps according to one or more aspects of an embodiment of the invention.
Figure 8B:
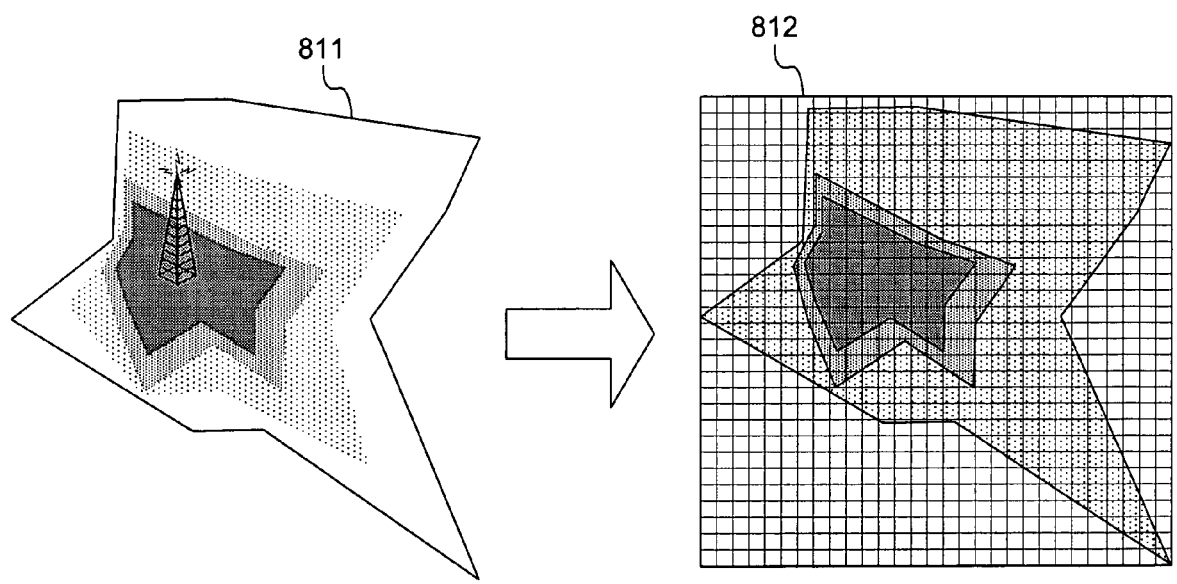

FIGS. 8A and 8B show examples of mapping differently shaped signal coverage areas into bitmaps according to one or more aspects of an embodiment of the invention. In FIG. 8A, cell coverage area 801 is mapped into cell unit grid 811. And in FIG. 8B, cell coverage area 802 is mapped into cell unit grid 812. For cell unit grids 811 and 812, depending on the size of their respective cell coverage areas 801 and 802, as well as other previously mentioned factors, each cell unit may encompass larger or smaller areas. In addition, the number of signal strength ranges may be varied as well. For example, cell unit grid 811 only uses two signal levels, whereas cell unit grid 812 uses three signal levels.

Figure 9:
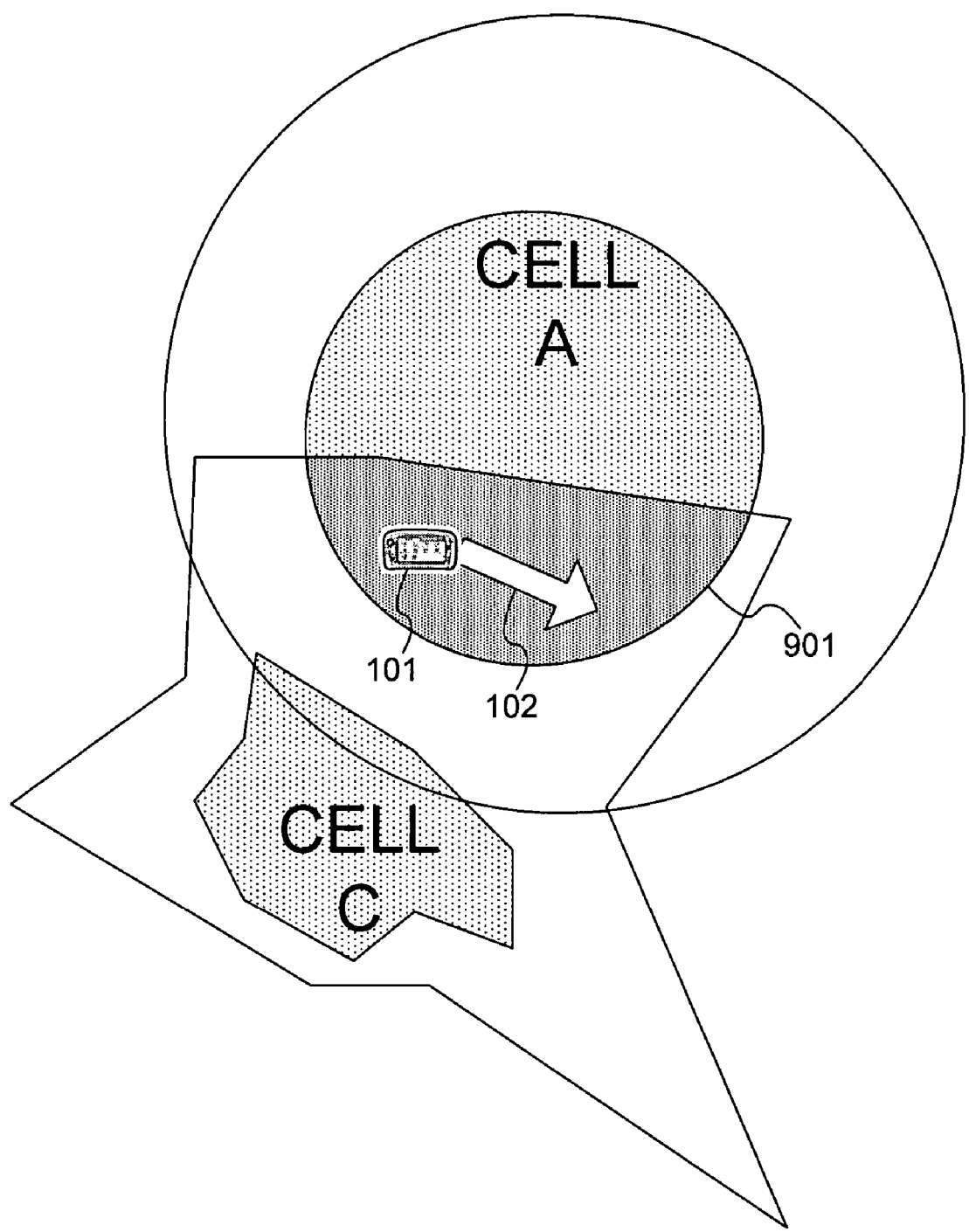
FIG. 9 shows advanced determination of location based on cell coverage information and signal strength measurements according to the invention according to one or more aspects of an embodiment of the invention.

When a mobile terminal receives bitmaps of cell coverage areas, it is able to make educated handover decisions with additional detail. Rather than working with bulky rectangles, a mobile terminal works with highly detailed data files, perhaps in the form of bitmaps. In addition to being able to make more educated handover decisions, a mobile terminal lacking a GPS or other positioning system is able to make better guesses about its exact location. FIG. 9 depicts mobile terminal 101 moving in direction 102 is able to determine that it is somewhere within shaded region 901. This is based on being able to receive the stronger signal from Cell A at the same time as receiving the weaker signal from Cell C and knowing the boundaries of the stronger and weaker signals.

Once a bitmap or other representation of a cell coverage area has been created, it is necessary to store and transmit this data. One means of doing so is through the use of a Cell Descriptor Table (CDT), or other data structure, to store metadata about a cell's coverage area and its bitmap representation. One possible structure for a CDT is shown in Table 1 below.

TABLE 1

Cell Description Table (CDT)

| Syntax | No. of bits | Identifier |
|---|---|---|
| cell_description_section( ) { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   cell_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   if (section_number == 0){ | | |
|     width | 8 | uimsbf |
|     height | 8 | uimsbf |
|     scale | 8 | uimsbf |
|     lo_bound | 8 | uimsbf |
|     hi_bound | 8 | uimsbf |
|     Depth | 3 | uimsbf |
|     Compression | 2 | bslbf |
|     reserved_future_use | 2 | bslbf |
|     Latitude | 25 | uimsbf |
|     Longitude | 26 | uimsbf |
|     reserved_future_use | 2 | bslbf |
|     data_length | 12 | uimsbf |
|     for(i=0;i<N;i++){ | | |
|       Byte | 8 | uimsbf |
|     } | | |
|   } | | |
|   for(i=0;i<N;i++){ | | |
|     cell_id_extension | 8 | uimsbf |
|     subcell_width | 8 | uimsbf |
|     subcell_height | 8 | uimsbf |
|     subcell_scale | 8 | uimsbf |
|     subcell_lo_bound | 8 | uimsbf |
|     subcell_hi_bound | 8 | uimsbf |
|     subcell_depth | 3 | uimsbf |
|     subcell_compression | 2 | bslbf |
|     reserved_future_use | 2 | bslbf |
|     subcell_latitude | 25 | uimsbf |
|     subcell_longitude | 26 | uimsbf |
|     reserved_future_use | 2 | bslbf |
|     subcell_data_length | 12 | uimsbf |
|     for(i=0;i<N;i++){ | | |
|       subcell_byte | 8 | uimsbf |
|     } | | |
|   } | | |
|   CRC_32 | 32 | rpchof |

Field descriptions of a CDT:

table_id: identifier of the table.

section_syntax_indicator: The section_syntax_indicator is a 1-bit field which shall be set to "1".

section_length: This is a 12-bit field, the first two bits of which shall be "00". It specifies the number of bytes of the section, starting immediately following the section_length field and including the CRC.

cell_id: This is a 16-bit field which uniquely identifies a cell.

version_number: This 5-bit field is the version number of the sub-table. The version_number shall be incremented by 1 when a change in the information carried within the sub_table occurs. When it reaches value 31, it wraps around to 0. When the current_next_indicator is set to '1', then the version_number shall be that of the currently applicable sub_table defined by the table_id, platform_id and action_type. When the current_next_indicator is set to '0', then the version_number shall be that of the next applicable sub_table defined by the table_id, platform_id and action_type.

current_next_indicator: This 1-bit indicator, when set to '1' indicates that the sub_table is the currently applicable sub_table. When the bit is set to '0', it indicates that the sub_table sent is not yet applicable and shall be the next sub_table to be valid.

section_number: This 8-bit field gives the number of the section. The section_number of the first section in the sub_table shall be "0x00". The section_number shall be incremented by 1 with each additional section with the same table_id, platform_id and action_type.

last_section_number: This 8-bit field indicates the number of the last section (that is, the section with the highest section_number) of the sub_table of which this section is part.

width: This 8-bit field specifies the width of the bitmap in pixels.

height: This 8-bit field specifies the height of the bitmap in pixels.

scale: This 7-bit field tells the geographical size of one bitmap pixel. The size is scale*10 m, so that e.g. 42 would specify that each pixel represents a geographical area of 420 m*420 m.

lo_bound: This 7-bit field is the low bound of field strength. It is the absolute value of the dBm value represented by pixel value 1. If bit depth is 1, this shall be the same as hi_bound.

hi_bound: This 7-bit field is the high bound of field strength. It is the absolute value of the dBm value represented by the highest possible pixel value. If bit depth is 1, this shall be the same as lo_bound.

latitude: This 25-bit field tells the geographical position of the lower-left (south-west) corner of the bitmap. This field shall be set to the two's complement value of the latitude, referenced to the WGS-84 reference ellipsoid, in units of $180/2^{23}$ degrees, in the range from −90 degrees to +90×(1−$2^{-24}$) degrees, counting positive angles north of the equator and negative angles south of the equator.

longitude: This 26-bit field tells the geographical position of the lower-left (south-west) corner of the bitmap. This field shall be set to the two's complement value of the longitude, referenced to the WGS-84 reference ellipsoid, in units of $360/2^{26}$ degrees, in the range from −180 degrees to +180×(1−$2^{-25}$) degrees, counting positive angles east of the Greenwich meridian and negative angles west of the Greenwich meridian depth: This 3-bit field is the bit depth of the bitmap. The bit depth tells how many bits are used to specify each pixel, i.e. bit depth of 4 would indicate that the bitmap has $2^4$=16 levels. It shall not be 0.

compression: This 2-bit field tells the compression method used to compress the bitmap data. Exemplary compression values are described in Table 2.

TABLE 2

Signalling compression method

| Compression | Compression method |
| --- | --- |
| 00 | Uncompressed |
| 01 | Reserved for future use |
| 10 | Reserved for future use |
| 11 | Reserved for future use | data_length: This 12-bit field specifies the length in bytes of the following bitmap data byte: This is an 8-bit field. An array of byte fields specify the bitstring of bitmap data compressed using the method specified in compression field. If necessary, the bitstring is padded with '0'-bits to meet the final 8-bit boundary at the end of data.

cell_id_extension: This 8-bit field is used to identify a subcell within a cell, for which a separate bitmap is available, perhaps providing more detailed data.

subcell_width: see width.
subcell_height: see height.
subcell_scale: see scale.
subcell_lo_: see lo_bound.
subcell_hi_bound: see hi_bound.
subcell_latitude: see latitude.
subcell_longitude: see longitude.
subcell_depth: see depth.
subcell_compression: see compression.
subcell_data_length: see data_length.
subcell_byte: see byte.

CRC_32: This is a 32-bit field that contains the CRC value that gives a zero output of the registers in the decoder defined in EN 300 468 after processing the entire private section.

Figure 10:
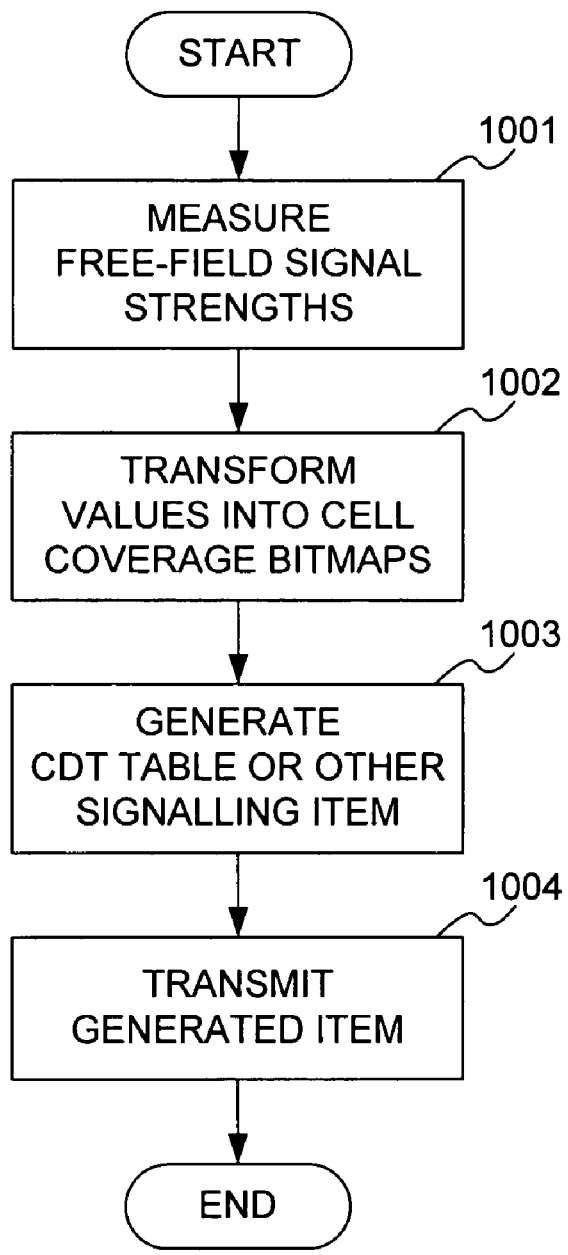
FIG. 10 shows a process for generating a cell description table or any other signaling item and transmitting it according to one or more aspects of an embodiment of the invention.

FIG. 10 depicts a process for generating a cell description table or any other signaling item and transmitting it according to one or more aspects of an embodiment of the invention. In step 1001, the free field signal strengths for a particular cell are measured using either mobile or stationary devices. The devices may include mobile terminals capable of consuming cell signal content, and may also include dedicated measurement devices. In step 1002, the measured strengths are converted into cell coverage bitmaps, such as described above. In step 1003, an entry in a cell description table is created for the cell, including within it metadata about the cell and its bitmap representation, as well as the bitmap itself. And in step 1004, the generated signaling item, such as the entry in the cell description table is transmitted for storage or use by mobile terminals.

Figure 11:
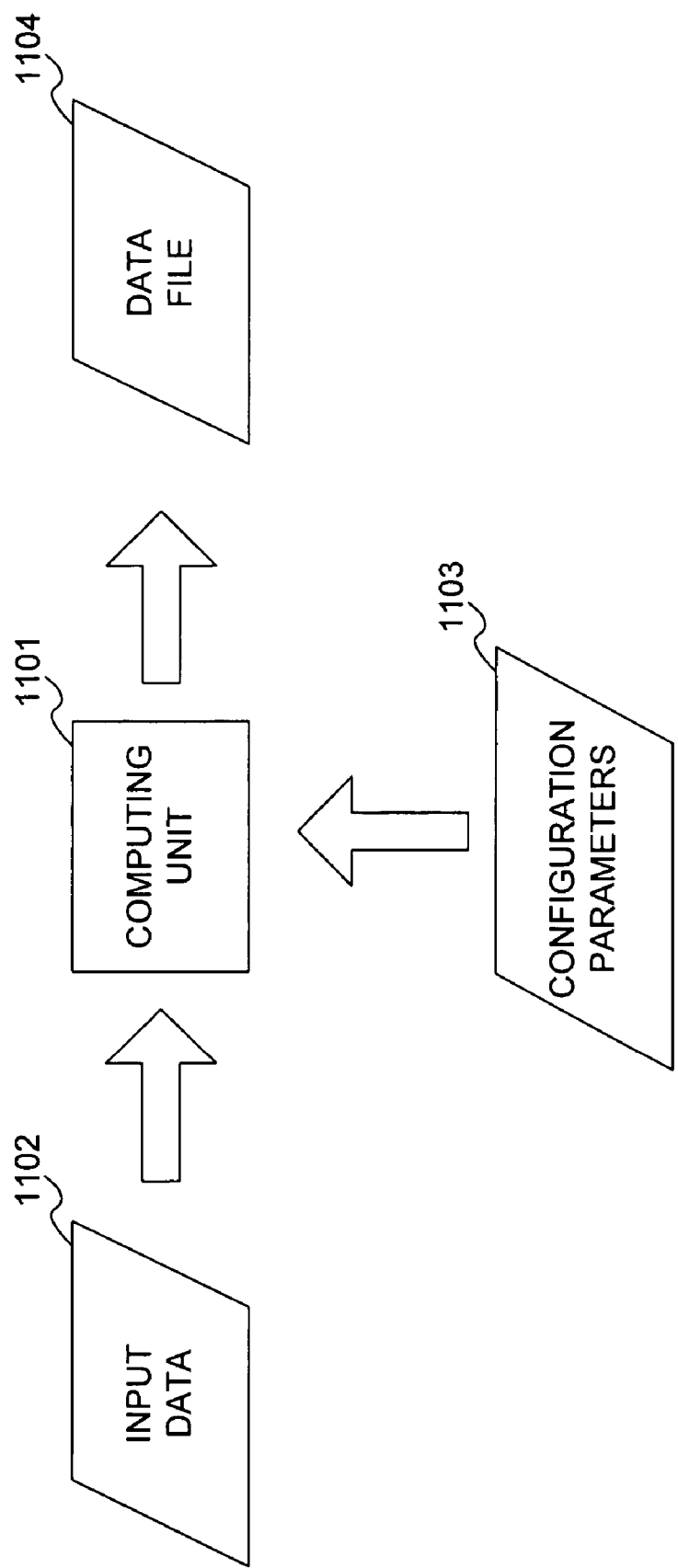
FIG. 11 shows a high level description of a process for bitmap information creation according to one or more aspects of an embodiment of the invention.

FIG. 11 shows a high level description of a process for bitmap information creation according to one or more aspects of an embodiment of the invention. Here, a computing unit 1101 resides within a mobile terminal, or within a server or other computing device. Computing unit 1101 takes input data 1102 about a cell coverage area, for example measurements of signal strength taken at various points around the cell. Computing unit uses configuration parameters 1103 in transforming the input data into a data file 1104 representation of the cell coverage area, perhaps in the form of a bitmap. Configuration parameters 1103 may include the number of signal strength ranges that should be used, the size and shape of the cell units used to model the cell, and other relevant parameters which effect the creation of data file 1104.

Figure 12:
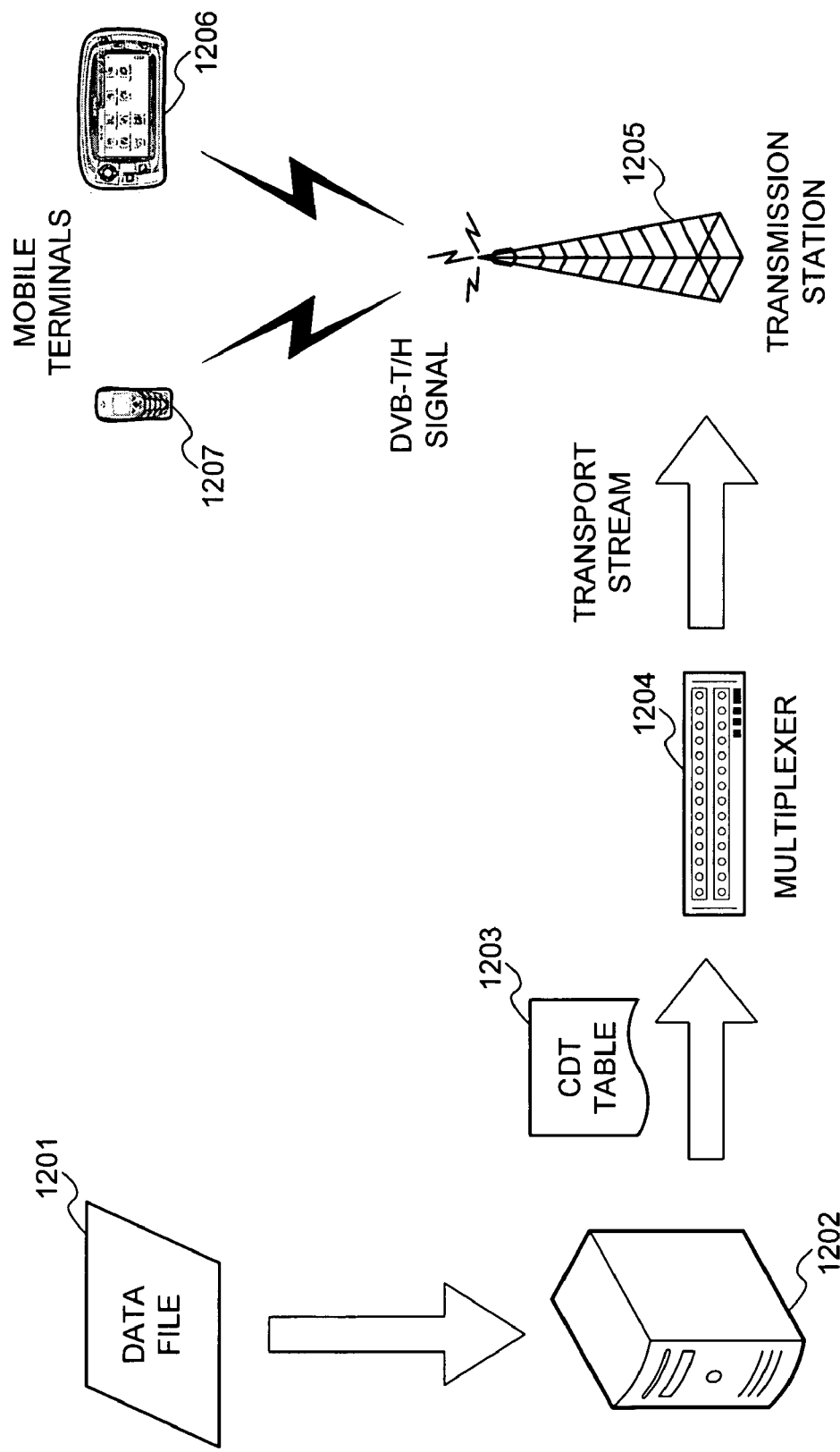
FIG. 12 shows a process for generating a cell description table and transmitting it to a mobile terminal in a DVB network according to one or more aspects of an embodiment of the invention.

FIG. 12 shows one possible process for generating and transmitting a cell description table to a mobile terminal in a DVB network according to one or more aspects of an embodiment of the invention. Data file 1201, residing in server 1202, is used to create an entry in a CDT table 1203. Data file 1201 is made up of a bitmap file, or other file capable of providing cell unit strength values in a similar fashion. CDT table 1203, including one or more cell entries, is passed to multiplexer 1204 in a digital video broadcast network (DVB). Multiplexer 1204 combines CDT tables with other digital content for broadcast as MPEG-TS transport streams from transmission station 1205.

The broadcast DVB-H/T signals are received by mobile terminals 1206 and 1207 which can then parse the cell coverage information from the CDT tables embedded in the signals.

In some embodiments, cells transmit their own signaling items, including bitmaps of cell coverage, in addition to those of their neighboring cells. In this manner, mobile terminal 101 can make predictions about signal strength in the direction in which it is traveling, and make educated handover decisions based on bitmap information from surrounding cells.

In addition to making better handover decisions, aspects of the invention enable a mobile terminal to avoid making unnecessary signal measurements, since signal strengths are known to a level of certainty. This amounts to a power savings since the mobile terminal's radio can be strategically powered down.

Figure 13:
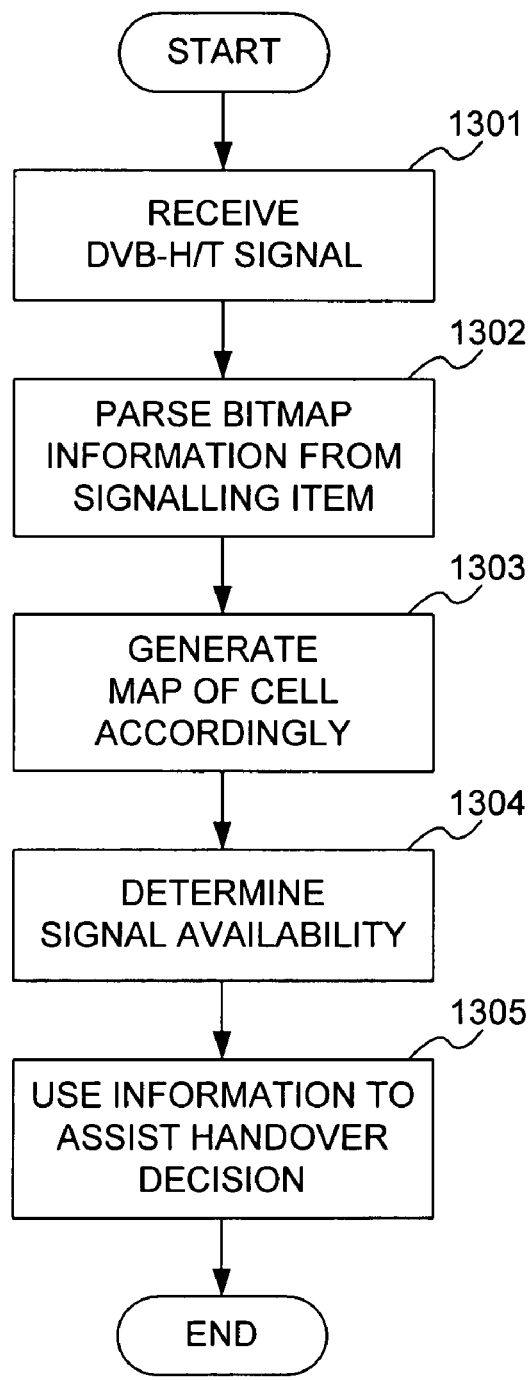
FIG. 13 shows a process for receiving a cell description table from a DVB network, parsing it, and using it in a mobile terminal according to one or more aspects of an embodiment of the invention.

FIG. 13 shows a process for receiving a cell description table from a DVB network, parsing it, and using it in a mobile terminal according to one or more aspects of an embodiment of the invention. At step 1301, a mobile terminal receives a DVB-H/T signal including digital video broadcast content, as well as at least one signaling item, such as a CDT table entry. At step 1302, the mobile terminal parses the bitmap information from the signaling item received. At step 1303, a map of the cell coverage area is created, and optionally overlaid with other maps of surrounding cells. Adjustments may need to be made to the newly received map in order to integrate it into the multi-cell map, such as accounting for disparities in strength ranges and cell unit scales (in the case of a CDT type signaling item, these values may be parsed from the CDT metadata). At step 1304, signal availability is determined based on the multi-cell map created, and by analyzing movement of the device through space. Finally, at step 1305, this information is used to make educated cell choices when needing to make a handover to an adjacent cell. Other methods for using signaling items such as a cell coverage bitmap to make educated cell handover decisions are available.

Figure 1:
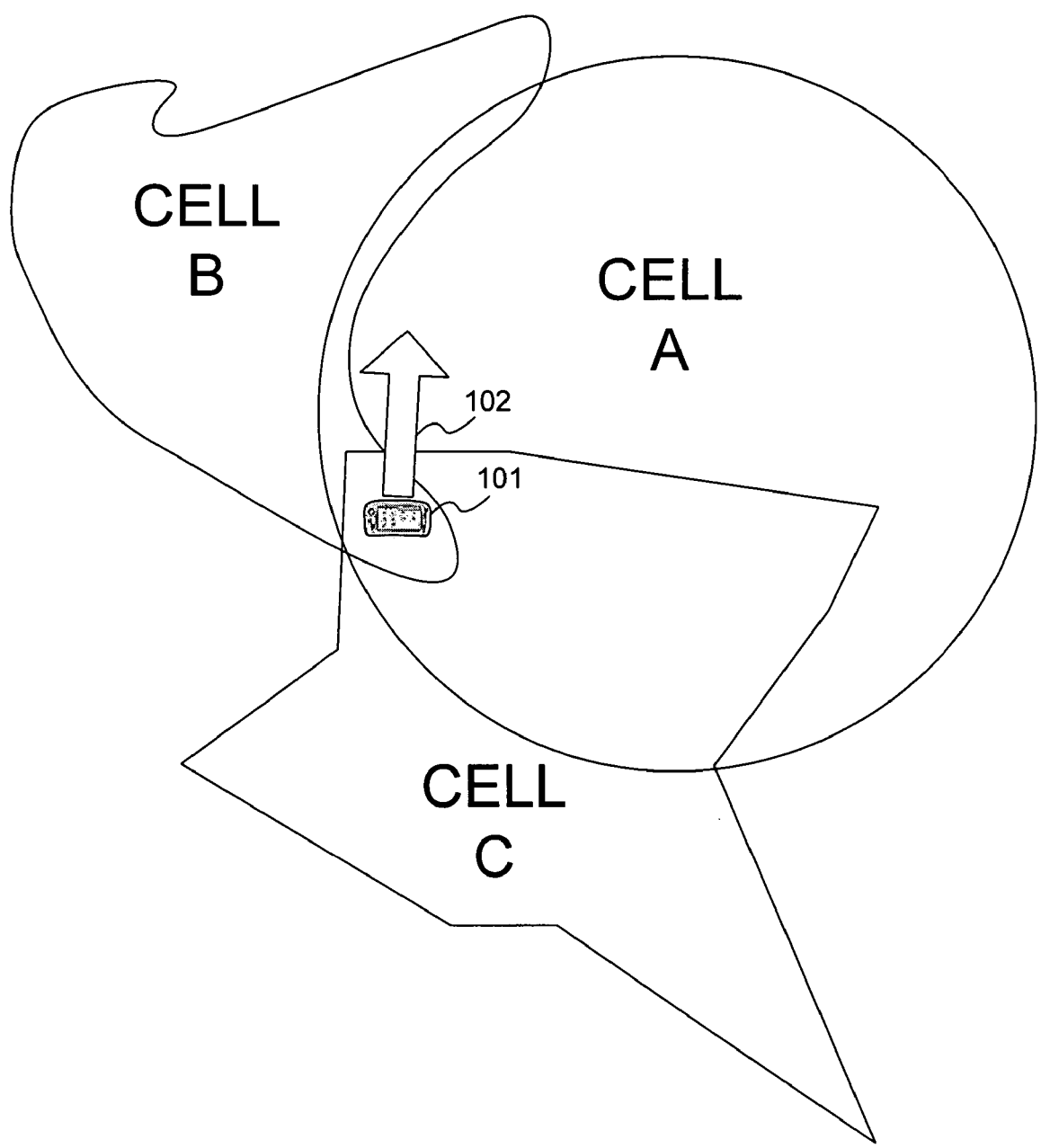
FIG. 1 is a prior art depiction of a mobile terminal moving through a group of cell signals defined using a single signal level.
Figure 2:
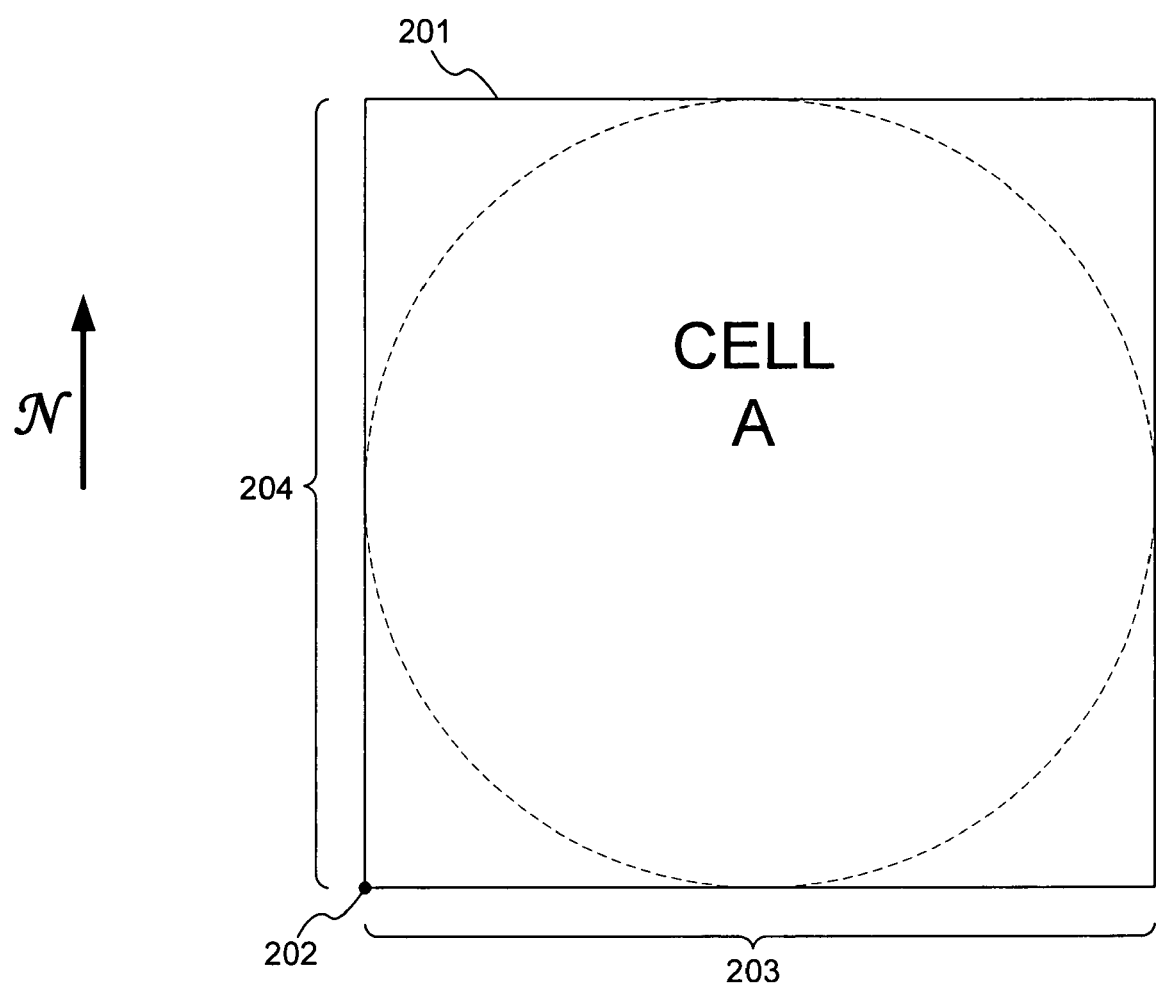
FIG. 2 is a prior art depiction of a spherical rectangle representation of a single cell coverage area.
Figure 3:
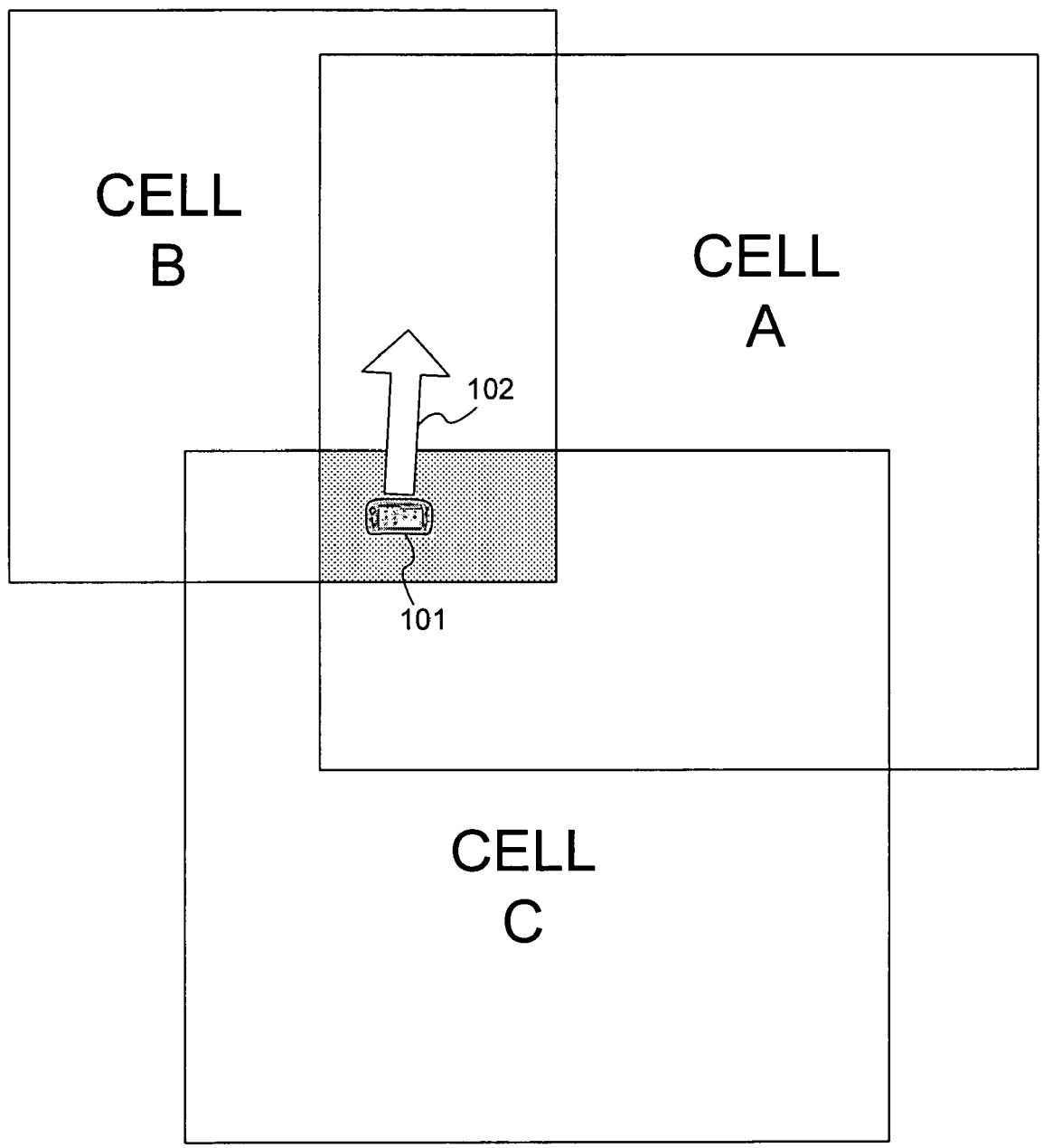
FIG. 3 is a prior art depiction of a mobile terminal moving through a group of cell signals defined using spherical rectangles.
Figure 4:
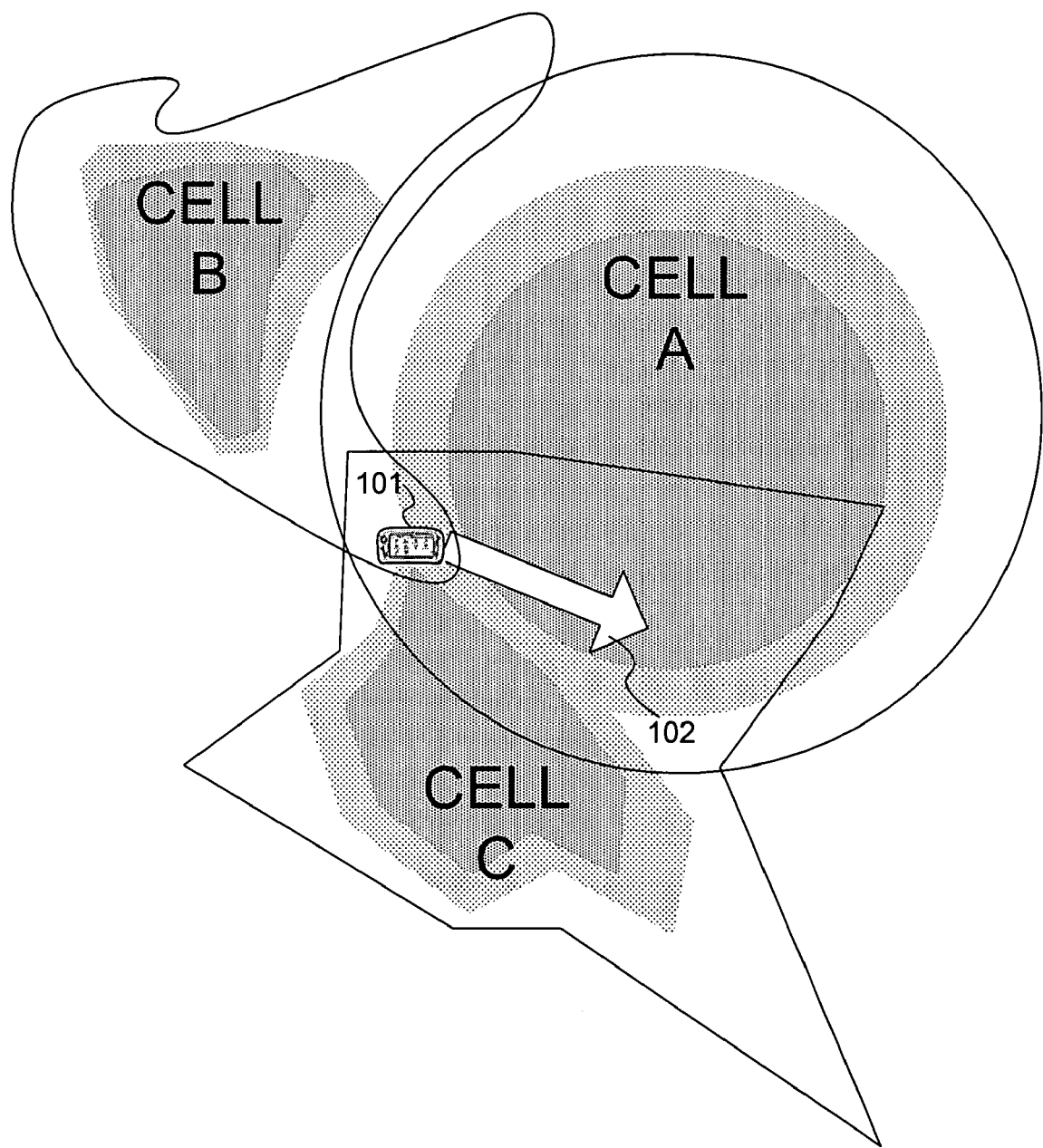
FIG. 4 depicts a mobile terminal moving through a group of cell signals displayed using shades to represent signal strength levels.
Figure 5:
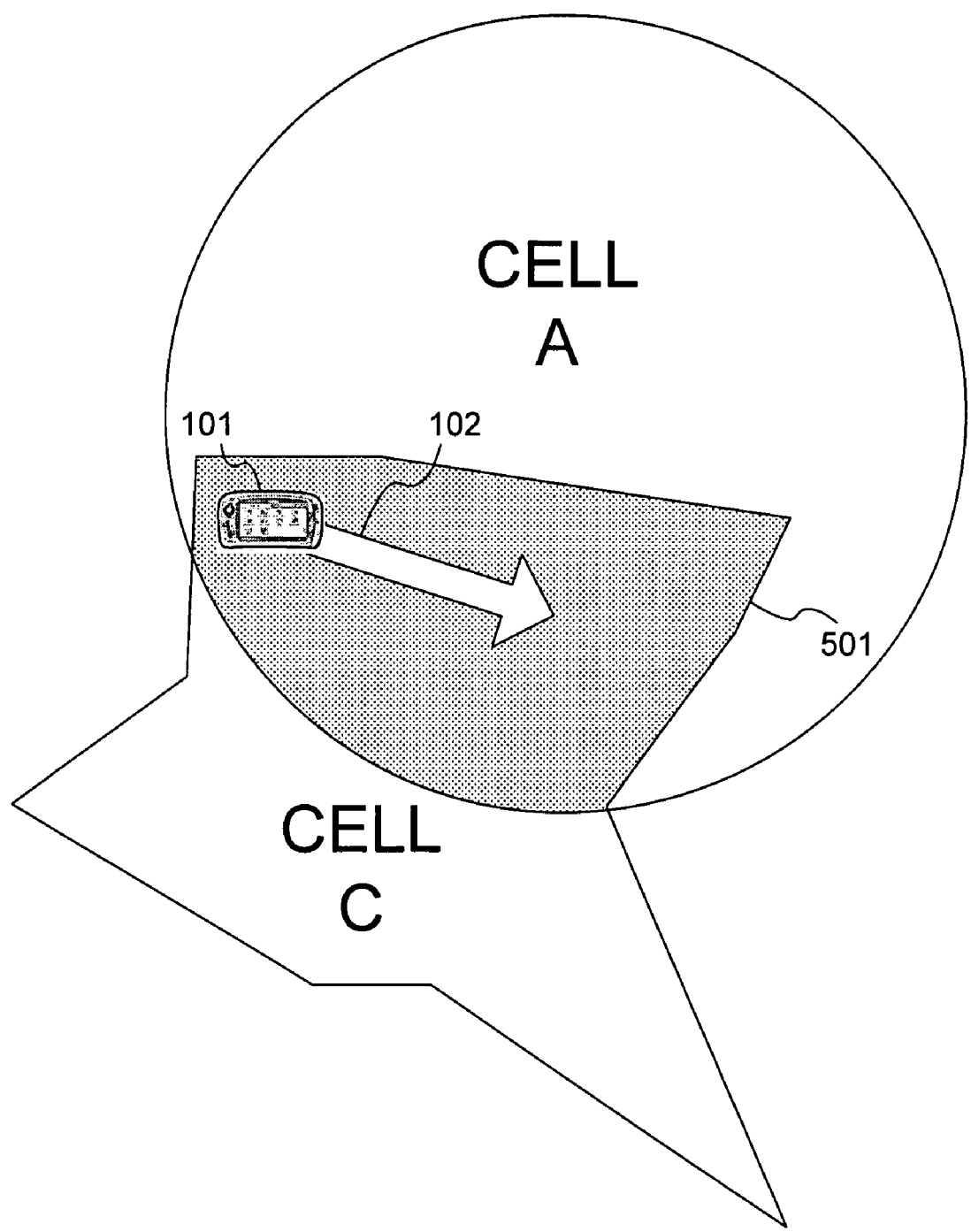
FIG. 5 is a prior art depiction of a mobile terminal moving through a pair of cell signals defined using a single signal level.
Figure 6:
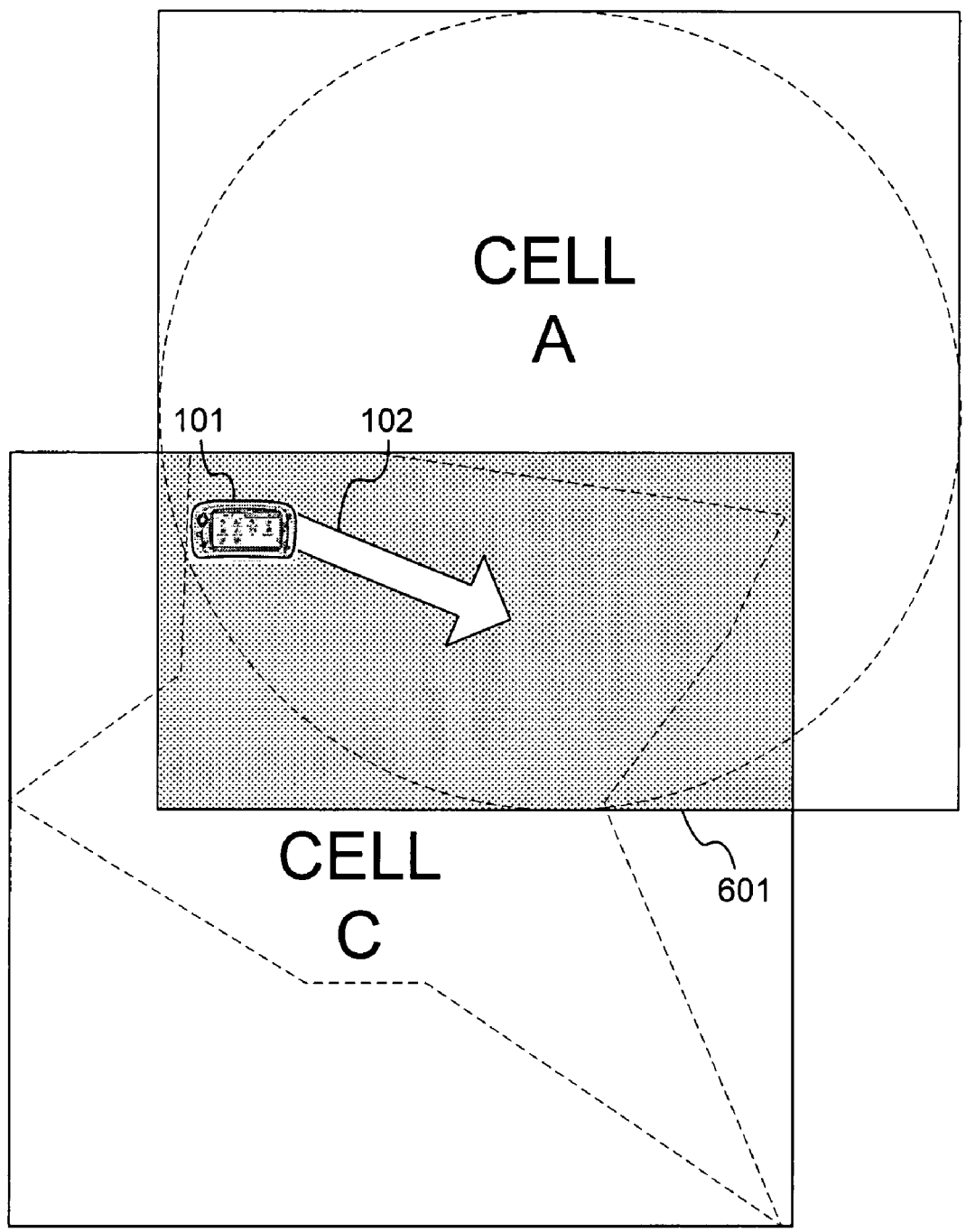
FIG. 6 is a prior art depiction of a mobile terminal moving through a pair of cell signals defined using spherical rectangles.
Figure 14:
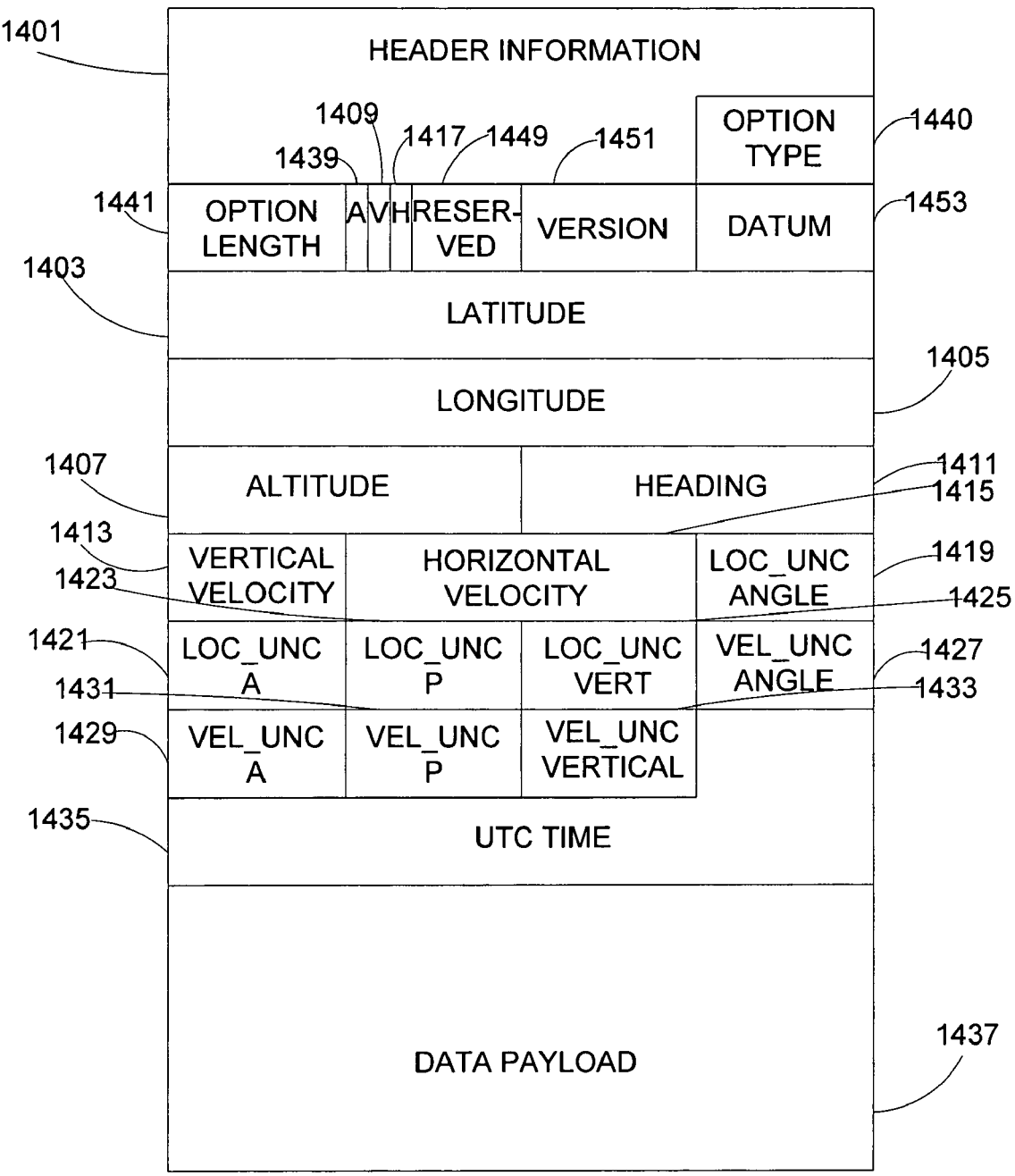
FIG. 14 depicts a data structure for expressing vector information according to one or more aspects of an embodiment of the invention.

FIG. 14 depicts a data structure for expressing vector information (e.g., vector 102 in FIG. 4), according to one or more aspects of an embodiment of the invention. Datagram 1400 comprises header information 1401 (such as the source IP address and the destination address) and data payload 1437. Also, datagram 1400 comprises geographical position information about a source device corresponding to a option type data field 1440, an option length data field 1441, a reserved data field 1449, a version data field 1451, a datum data field 1453, a latitude data field 1403, a longitude data field 1405, an altitude data fields 1407 and 1439, velocity data fields 1409, 1411, 1413, and 1415, location uncertainty data fields 1417, 1419, 1421, 1423, and 1425, velocity uncertainty data fields 1427, 1429, 1431, and 1433, and time data field 1435. Time data field 1435 is a 40-bit field that contains the current time and data in Coordinated Universal Time (UTC) and Modified Julian Date (MJD). Field 1435 is coded as 16 bits providing 16 LSBs of the MJD followed by 24 bits that represent 6 digits in a 4-bit Binary-Coded Decimal (BCD). In the exemplary embodiment, the geographical information is contained in a destination options header or in a hop-by-hop header, in compliance with RFC 2460. In the embodiment, a destination options header and a hop-by-hop header may be contained in the same datagram.

Referring to FIG. 14, the full width corresponds to 32 bits (4 octets). However, other embodiments of the invention may utilize different data field alignments and different data widths for any of the data fields. In the exemplary embodiment, the data fields may be contained in a header that is compatible with RFC 2460.

In the exemplary embodiment, version data field 1451 is an 8-bit field that indicates the version of the message header. Datum data field 1453 is an 8-bit field that indicates the used map datum (e.g., standard MIL-STD-2401) for determining the geographical position. Latitude data field 1403 is a 32-bit field that indicates the latitude value of the source device (e.g., corresponding to an approximate location of terminal node 107) presented in ANSI/IEEE Std 754-1985 format. Longitude data field 1405 is a 32-bit field that indicates the longitude value of the source device presented in ANSI/IEEE Std 754-1985 format. Alt indicator data field 1439 is a 1-bit field indicating the use of altitude information. Altitude data field is a 16-bit field that indicates the altitude value of the source device presented in ANSI/IEEE Std 754-1985 format.

Velocity indicator data field 1409 is a 1-bit field indicating the use of velocity information. If velocity information is included, this field is set to '1'. Otherwise this field is set to '0'. Heading data field 1411 is a 16-bit field that indicates the direction where the mobile node is moving. If velocity indicator data field 1409 is set to '0', this field is ignored. Otherwise, this field is included and is set to the angle of axis of horizontal velocity uncertainty, in units of 5.625 degrees, in the range from 0 to 84,375 degrees, where 0 degrees is True North and the angle increases toward the East. Vertical velocity data field 1413 is an 8-bit field, which indicates the vertical velocity of the mobile node. Vertical velocity data field 1413 is used if field 1409 is set to '1'. Horizontal velocity data field 1415 is a 16-bit field that indicates the horizontal velocity of the mobile node. If velocity indicator is set to '1', this field is in use. Once used, the horizontal speed is set in units of 0.25 m/s, in the range from 0 to 511.75 m/s. Otherwise this field is ignored.

Loc_Unc_H indicator data field 1417 is a 1-bit field which indicates the horizontal position uncertainty, including elliptical. If elliptical horizontal position uncertainty information is included in this response element, this field is set to '1'. Otherwise, this field is set to '0'. Loc_Unc angle data field 1419 (angle of axis of the standard error ellipse for horizontal position uncertainty) is a 8-bit field indicating the angle of axis of the standard error ellipse for horizontal position uncertainty. If Loc_Unc_H indicator field 1417 is set to '0', this field is ignored. Otherwise, this field is included and is set to angle of axis for horizontal position uncertainty, in units of 5.625 degrees, in the range from 0 to 84.375 degrees, where 0 degrees is True North and the angle increases toward the East. Loc_Unc A data field 1421 (standard deviation of error along angle specified for horizontal position uncertainty) is a 8-bit field indicating the Standard deviation of error along angle specified for horizontal position uncertainty. If Loc_Unc A data field 1421 is set to '0', this field is ignored. Otherwise, this field is included and is set to represent the standard deviation of the horizontal position error along the axis corresponding to Loc_Unc angle data field 1419. Loc_Unc P data field 1423 (standard deviation of error along angle specified for horizontal position uncertainty) is a 8-bit field indicating standard deviation of error along angle specified for horizontal position uncertainty. If Loc_Unc P data field 1423 is set to '0', this field is ignored. Otherwise, this field is included and is set to represent the standard deviation of the horizontal position error perpendicular to the axis corresponding to Loc_Unc angle data field 1419. Loc_Unc vertical data field 1425 (standard deviation of vertical error for position uncertainty) is a 8-bit field indicating standard deviation of vertical error for position uncertainty.

Vel_Unc angle data field 1427 (angle of axis of standard error ellipse for horizontal velocity uncertainty) is a 8-bit field indicating the angle of axis of standard error ellipse for horizontal velocity uncertainty. If Vel_Unc angle data field 1427 is set to '0', this field is ignored. Otherwise, this field is set to the angle of axis for horizontal velocity uncertainty, in units of 5.625 degrees, in the range from 0 to 84,375 degrees, where 0 degrees is True North and the angle increases toward the East. Vel_Unc A data field 1429 (standard deviation of error along angle specified for horizontal velocity uncertainty is a 8-bit field indicating standard deviation of error along angle specified for horizontal velocity uncertainty. If velocity indicator data field 1409 is set to '1', this field is included and is set to represent the standard deviation of the horizontal velocity error along the angle corresponding to Vel_Unc angle data field 1427. Vel_Unc P data field data field 1431 (standard deviation of error perpendicular to angle specified for horizontal velocity uncertainty) is a 8-bit field indicating standard deviation of error perpendicular to angle specified for horizontal velocity uncertainty. If velocity indicator data field 1409 is set to '1', this field is included and is set to represent the standard deviation of the horizontal velocity error perpendicular to the angle corresponding to Vel_Unc angle data field 1427. Otherwise, this field is ignored. Vel_Unc vertical data field 1433 (standard deviation of vertical velocity error) is an 8-bit field indicating the standard deviation of vertical velocity error.

In the embodiment, location uncertainty data fields 1419-1425 may be used to define a geographical area, where the data of location uncertainty data fields may not be as specified by Standards, but can be used by an application for conveying region information. In such a case, the application could recognize the use of location uncertainty data fields 1419-1425 and/or the variation from the specification as indicated in some other field of the header.

Sharing Cell Coverage Information

Figure 15:
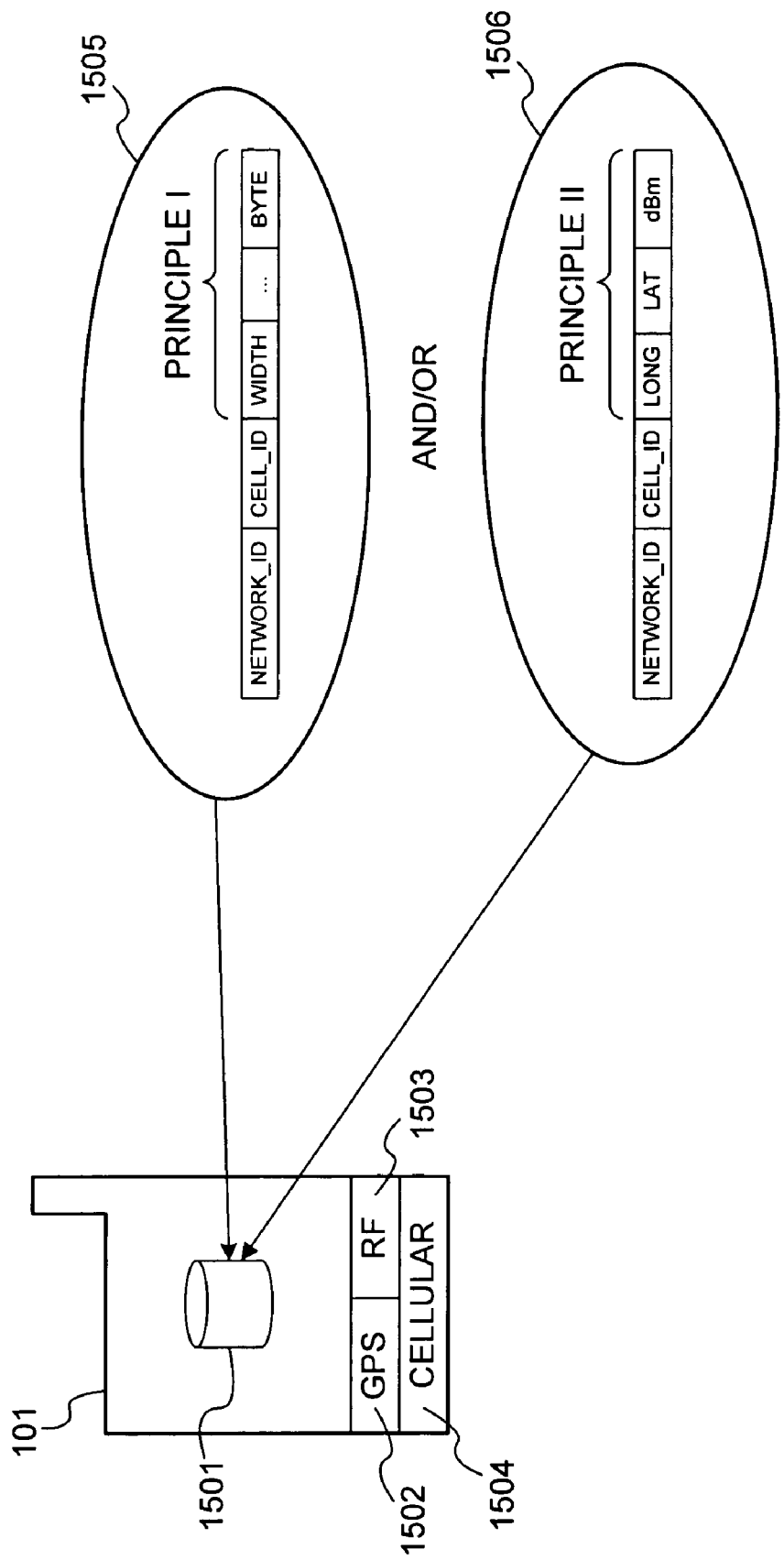
FIG. 15 depicts a functional diagram of a mobile terminal including cell coverage information according to one or more aspects of an embodiment of the invention.

FIG. 15 depicts a functional diagram of mobile terminal 101 including multiple forms of cell coverage information (CCI) according to one or more aspects of an embodiment of the invention. Mobile terminal 101 includes memory 1501, either volatile or non-volatile, for storing CCI. CCI may be stored in a database format, where information is stored in fields or columns, and multiple entries appear as rows.

CCI may also be stored as individual bitmaps in a multi-cell map, or simply stored as individual files in memory or a file system. Aspects of the invention provide that CCI may be stored using either one of two principles, although one skilled in the art will recognize that additional forms of cell coverage information may be used. Principle I data 1505 includes cell coverage data that has been analyzed and formatted into a bitmap or similar format, and includes cell coverage metadata. Principle I includes CCI stored in the previously described CDT table format. Principle II data 1506 includes raw point cell coverage data in the form of point locations (e.g., latitude and longitude) coupled with signal strengths (e.g., dBm). Either form of cell coverage information may be stored and used by mobile terminal 101, although Principle II data 1506 requires more processing in order to be useful in handover decisions.

Mobile terminal 101 may include multiple forms of reception and transmission functionality. Although three particular functions are shown, more or less may be used to take advantage of embodiments of the invention. GPS 1502 relies on signals received from satellites to determine the latitude and longitude of the mobile terminal's current location. Other positioning systems may provide alternatives to GPS 1502, including assisted GPS (AGPS). RF component 1503 may be used to receive a primary signal of interest, for example a DVB-T/H broadcast signal. Mobile terminal 101 may, in addition to using CCI to find the strongest signal, may create its own Principle II CCI, recording location and signal strength throughout the cell coverage area. Other wireless components (not shown) may use short range radio or optical standards to communicate with nearby devices. For example, Bluetooth, WiFi, RFID, IrDA, Ultra-wideband (UWB) or another short range wireless communication standard may be used. Conventional mid to long range signalling such as cellular system 1504 can also be useful in sending and receiving CCI. Cellular system 1504 may share resources and functionality with RF system 1503.

Figure 16A:
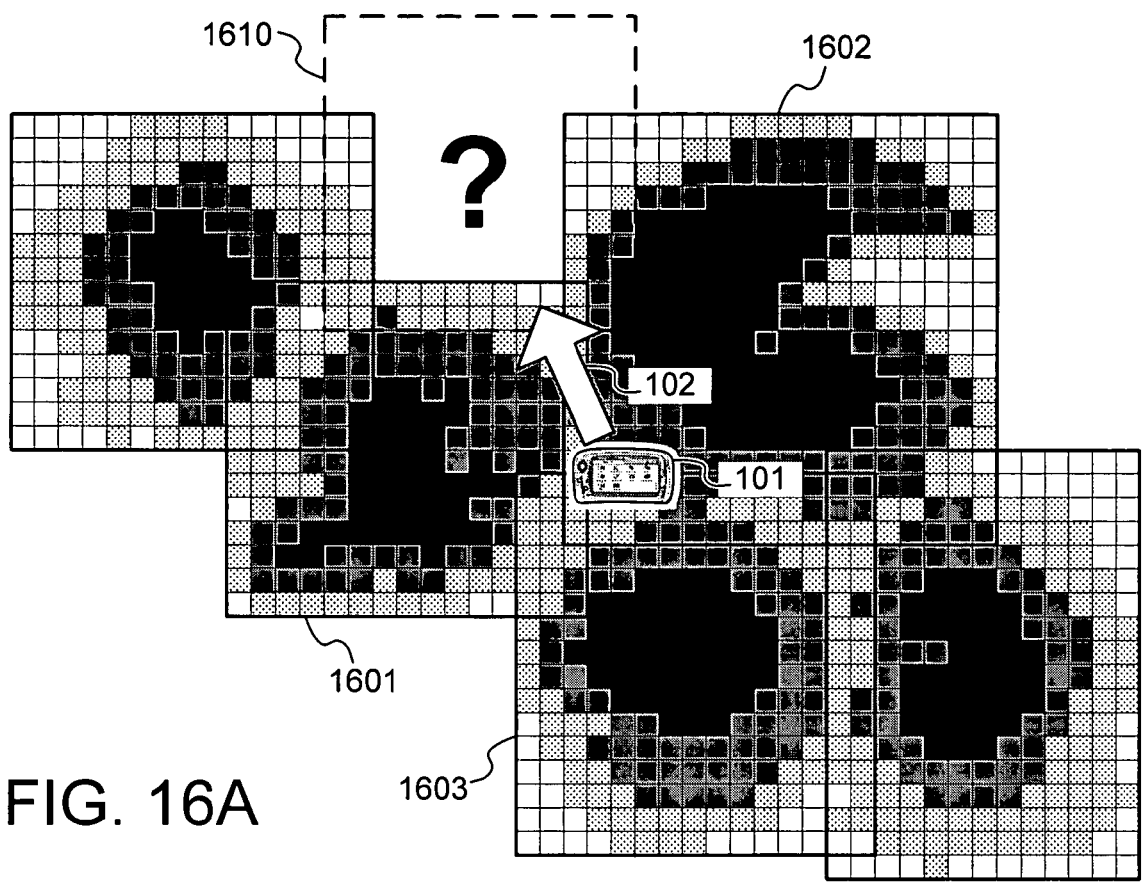
FIGS. 16A and 16B depict a mobile terminal moving through a group of cell signals defined using bitmap cell coverage information according to one or more aspects of an embodiment of the invention

In order to effectively utilize CCI, a mobile terminal 101 may be able to maintain data about multiple cells simultaneously. By examining surrounding cell coverage, and predicting the direction and speed of motion, mobile terminal 101 can perform handover operations that maintain continuous coverage and are less likely to fade. One method of maintaining data about multiple cells is to combine Principle I bitmap data into one large dynamic cell coverage map and tracking location and velocity of mobile terminal 101 on the map. FIG. 16A depicts mobile terminal 101 moving along vector 102 through a group of cell signals defined using bitmap cell coverage information according to one or more aspects of an embodiment of the invention. Mobile terminal 101 is leaving cell 1603 and must select a destination cell for a handover from among cell 1601 or cell 1602, or possibly even unknown cell 1610. By using the map, mobile terminal 101 can predict its immediate destination and determine that it does not have Principle I CCI for the empty portion of unknown cell 1603. Mobile terminal 101 may be able to infer coverage if it had Principle II raw coverage points within the missing cell, but such calculations would require more time and processing power.

Figure 16B:
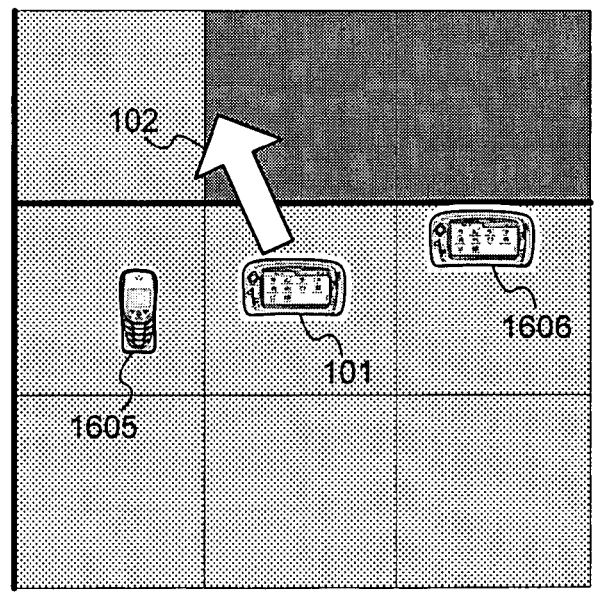

FIG. 16B zooms in on FIG. 16A, displaying the cell units in larger form. Here, two other mobile terminals are nearby, and may be of use to mobile terminal 101. Mobile terminal 1608 is a smaller handheld device, whereas mobile terminal 1606 is of the same type as mobile terminal 101.

FIG. 17 depicts a mobile terminal in communication with a selection of devices according to one or more aspects of an embodiment of the invention. Here, mobile terminal 101 needs missing CCI for a particular cell or geographic location, and it checks a series of potential sources, although not necessarily in the order set forth below. One possible source of CCI data is the broadcast stream coming from broadcast transmitter 1701, along path A. The signal delivered by transmitter 1701 (e.g., a DVB-T/H signal) may include Principle I CCI data for the current and neighboring cells. This CCI is sourced from cell coverage information center 1705, which includes server 1703 (or more likely multiple servers) and cell coverage database 1704 (CCD).

If the broadcast signal does not have the desired CCI, mobile terminal 101 may attempt to sense other mobile terminals, using a wireless communication scheme, such as Bluetooth, WiFi, IrDA, UWB, or some other ad hoc signaling method that allows peer-to-peer communications. Here, both mobile terminals 1605 and 1606 may be within range. Path B represents a wireless conversation between mobile terminal 101 and smaller mobile terminal 1605. Although mobile terminal 1605 may contain CCI for the cell in question, it may be of the wrong class, since the devices have different viewing dimensions and sizes. (Class of signal may also depend on factors such as installed plug-ins, size of memory, and so forth) As such, the signal strengths in the memory of smaller mobile terminal 1605 may be of no use, since it actually receives a different signal than larger terminal 101. Path C represents a wireless conversation between mobile terminal 101 and similar mobile terminal 1606. If mobile terminal 1606 has the data desired, it can respond with the appropriate signaling item, such as a CDT table. If mobile terminal 1606 does not have the data, it may be able to provide mobile terminal 101 with a location for the information. For example, mobile terminal 1606 may be able to provide an IP address, username and password from which mobile terminal 101 can transfer the data (via PPP, FTP, HTTP, etc.). Although not shown, mobile terminal 101 may communicate with another mobile terminal using a cellular data call, via the Internet, via SMS, or via some other indirect communication method. Messages to mobile terminals may also be sent via a broadcast network, such as a DVB-T/H network, where incoming messages are sent to the DVB-T/H network via SMS, MMS, Internet connection, or ad hoc signaling systems. These incoming messages are then forwarded via the broadcast signal to a recipient mobile terminal.

If other mobile terminals do not have the cell coverage information sought, other communication routes may be available to mobile terminal 101. Path D represents a cellular conversation between mobile terminal 101 and cell coverage center 1705 via cell tower 1702. Mobile terminal 101 may be able to make a data call, and download the proper CCI directly. Path E represents a conversation (either wired or wireless) between mobile terminal 101 and cell coverage center 1705 via a network 1706, such as the Internet or an intranet. A wireless conversation may take place via a cellular system or a WiFi connection. A wired conversation may take place via a sync cable or other direct connection with a computer or a network. As before, mobile terminal 101 may be able to download the proper CCI directly, perhaps using an IP address, username, and password previously provided by mobile terminal 1606. Other methods of communication between mobile terminal 101 and cell coverage information center 1705 are conceivable, both wired and wireless.

Figure 18:
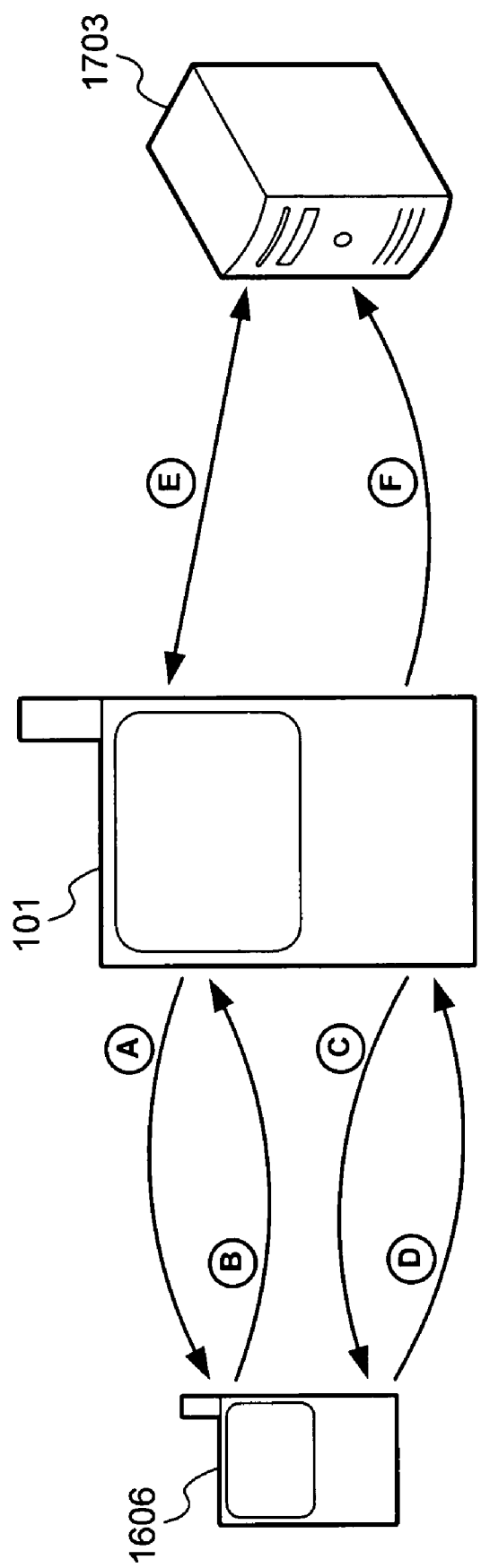
FIG. 18 depicts a mobile terminal in communication with a second mobile terminal and a server according to one or more aspects of an embodiment of the invention.

FIG. 18 depicts mobile terminal 101 in communication with similar mobile terminal 1606 and CCI server 1703 according to one or more aspects of an embodiment of the invention. Turning now to the specific messages of conversations between mobile terminal 101 and other devices. Beginning with communication between mobile terminal 101 and similar mobile terminal 1606, the method of communication is not relevant, whether wireless, via the Internet, via broadcast, etc. Assuming communication is possible using one of these methods, the individual messages are now in the spotlight. Message A represents an initial query or discovery, referred to as a CCI Discovery message. The components of the message are set forth in the table below.

TABLE 3

CCI Discovery

| Message Field Name | Description |
| --- | --- |
| CCI Message Type | Indicates the Type of Message: CCI Discovery |
| CCI Discovery Method | Indicates the desired CCI discovery method. If the method requested is not available in the receiving terminal, then no method is indicated in the reply. |
| Terminal Class | Indicates the class of the requesting terminal. If the class of the receiving terminal does not match, then a "not available" status is provided in the reply. Sending terminal can set this field to "any class" to prevent filtering. |
| Geographical Range | Contains the geographical range for the requested CCI metadata. "Not available" is sent in the reply if the receiving terminal has no CCI metadata for the given geographical range. |

The CCI Discovery message is received by mobile terminal 1606, which then replies with a standardized reply, Message B, also known as a CCI Reply. The components of this message are set forth below.

TABLE 4

CCI Reply (to Discovery)

| Message Field Name | Description |
| --- | --- |
| CCI Message Type | Indicates the Type of Message: CCI Reply |
| Reply Type | Indicates the type of the reply (i.e., whether it is a reply to a CCI Discovery or a CCI Request). |
| CCI Type | Indicates the types of CCI (e.g., Principle I, Principle II, CDT, etc.) that are available on the replying terminal, depending on discovery parameters. |
| Terminal Class | Indicates the class of CCI metadata available on the replying terminal (e.g. screen resolution, needed plugins, etc), depending on discovery parameters. |
| Geographical Range | Contains the geographical range available on the replying terminal. "Not available" is sent in the reply if the replying terminal has no CCI metadata for the geographical range depending on discovery parameters. |
| CCI Discovery Info | Informs of parameters (e.g., IP address, user, password, and port) leading to the requested data on another device. |

Once the reply to the discovery message is received, mobile terminal 101 may make a specific request, assuming similar mobile terminal 1606 had CCI metadata within the range sought by the discovery. Message C, also known as a CCI Request, is broken down below.

TABLE 5

CCI Request

| Message Field Name | Description |
| --- | --- |
| CCI Message Type | Indicates the Type of Message: CCI Request |
| CCI Type | Indicates the CCI type requested (e.g., Principle I, Principle II, CDT, etc.). Can also be set to "any type", where priority is given to a particular type, but other types are acceptable if the primary is not available. |
| Terminal Class | Indicates the class of the requesting terminal (e.g. screen resolution, needed plugins, etc). If the class of the requesting and receiving terminals don't match, then "not available" status is provided in the reply. If the requesting terminal doesn't care about class, it can put an "any class" indicator in this field. |
| Geographical Range | Contains the geographical range available on the replying terminal. "Not available" is sent in the reply if the replying terminal has no CCI metadata for the geographical range depending on discovery parameters. |

Upon receiving the CCI Request, the receiving terminal 1606 responds with Message D, another CCI Reply, the components of which are set forth below.

TABLE 6

CCI Reply (to Request)

| Message Field Name | Description |
| --- | --- |
| CCI Message Type | Indicates the Type of Message: CCI Reply |
| Reply Type | Indicates the type of the reply (i.e., whether it is a reply to a CCI Discovery or a CCI Request). |
| CCI Type | Indicates the type of CCI (e.g., Principle I, Principle II, CDT, etc.) provided in this response. |
| Terminal Class | Indicates the class of CCI metadata provided in the repsonse (e.g. screen resolution, needed plugins, etc). |
| Geographical Range | Contains the geographical range provided in the response. |

TABLE 6-continued

CCI Reply (to Request)

| Message Field Name | Description |
| --- | --- |
| CCI Data | The CCI data. |

If the original CCI Reply (Message B) to the initial CCI Discovery responded with CCI Discovery information, including an IP Address, User, Password, and Port, then mobile terminal 101 may initiate an FTP or HTTP download (Message E) of the data from server 1703. Alternatively, mobile terminal 101 may initiate a PPP conversation with server 1703, possibly using CCI Discoveries, CCI Requests and CCI Replies to retrieve CCI data, as before.

If mobile terminal 101 has been gathering Principle II CCI signal values, it may need to offload them to server 1703 at cell coverage information center 1705 (not shown).

To perform this operation, mobile terminal 101 uses a CCI Push message (Message F) to push the data to server 1703, where it can be stored, analyzed, converted to Principle I data, and forwarded to other mobile terminals. The substance of a CCI Push message is set forth below.

TABLE 7

CCI Push

| Message Field Name | Description |
| --- | --- |
| CCI Message Type | Indicates the Type of Message: CCI Push |
| CCI Type | Indicates the type of CCI (e.g., Principle I, Principle II, CDT, etc.) provided in this push, or that is available with CCI discovery parameters. |
| Terminal Class | Indicates the class of CCI metadata provided in the push (e.g. screen resolution, needed plug-ins, etc) or available with CCI discovery parameters. |
| Geographical Range | Contains the geographical range provided in this push, or available with CCI discovery parameters. |
| CCI Discovery Info | If this is a reply to a CCI discovery, informs of parameters (e.g., IP address, user, password, and port) for the CCI discovery. Otherwise, field is left out. |
| CCI Data | The CCI data. |

Although a geographical range is specified in the above messages, such messages may also request CCI data based on a particular cell identifier, political subdivision, postal code, and so forth. These messages present one method for requesting, receiving and transmitting cell coverage information.

Figure 19:
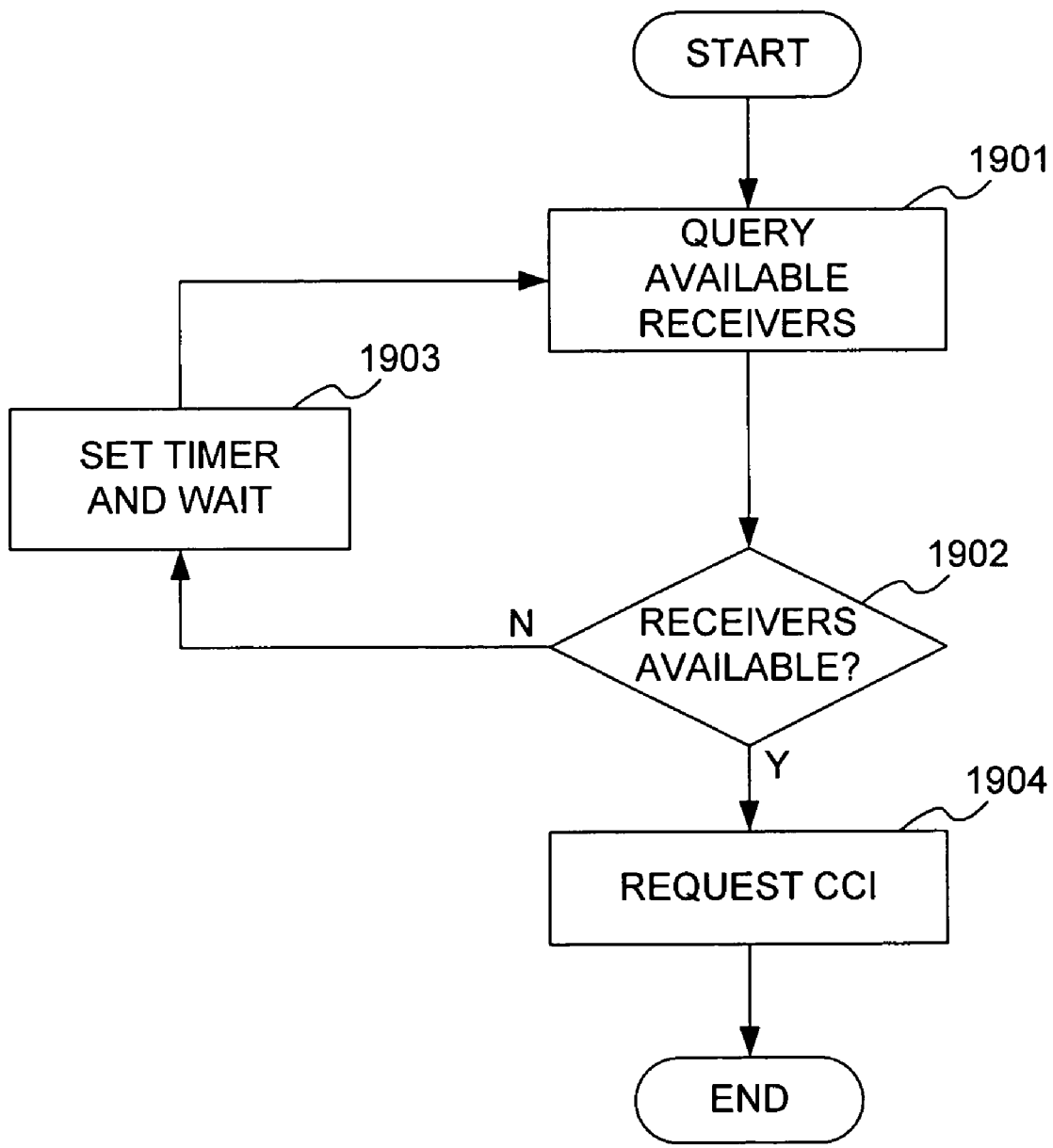
FIG. 19 illustrates a process for issuing a cell coverage information request according to one or more aspects of an embodiment of the invention.

FIG. 19 illustrates a process for issuing a cell coverage information request according to one or more aspects of an embodiment of the invention. At step 1901, available receivers, such as DVB-T/H receivers, are sought, whether via direct connections, such as ad hoc wireless standards, or via Internet or other indirect connections. If no receivers are available at decision 1902, then a timer is set for a specific period of time at step 1903. When the timer expires, control returns to step 1901, again seeking available receivers. If receivers, such as other mobile terminals, are available, then a CCI Discovery or CCI Request can be forwarded to the receiving device.

Figure 20:
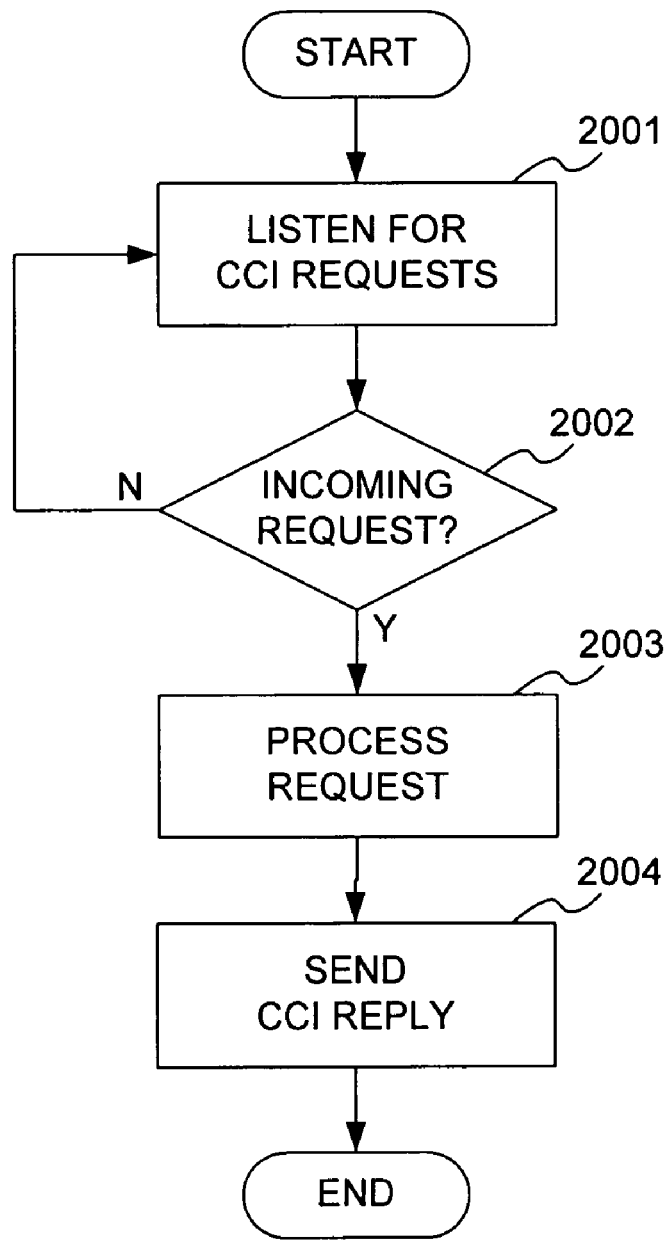
FIG. 20 illustrates a process for issuing a cell coverage information reply according to one or more aspects of an embodiment of the invention.

FIG. 20 illustrates a process for issuing a cell coverage information reply according to one or more aspects of an embodiment of the invention. At step 2001, a listener is set up to wait for incoming CCI Discoveries or CCI Requests. If no requests are forthcoming, at decision 2002, then control returns to step 2001. If a request is received, then processing of the request is handled at step 2003. If the incoming message is a discovery, the appropriate information is assembled, and if the message is a request, likewise that information is assembled. At step 2004, the CCI Reply is transmitted back to the requesting terminal.

Figure 21:
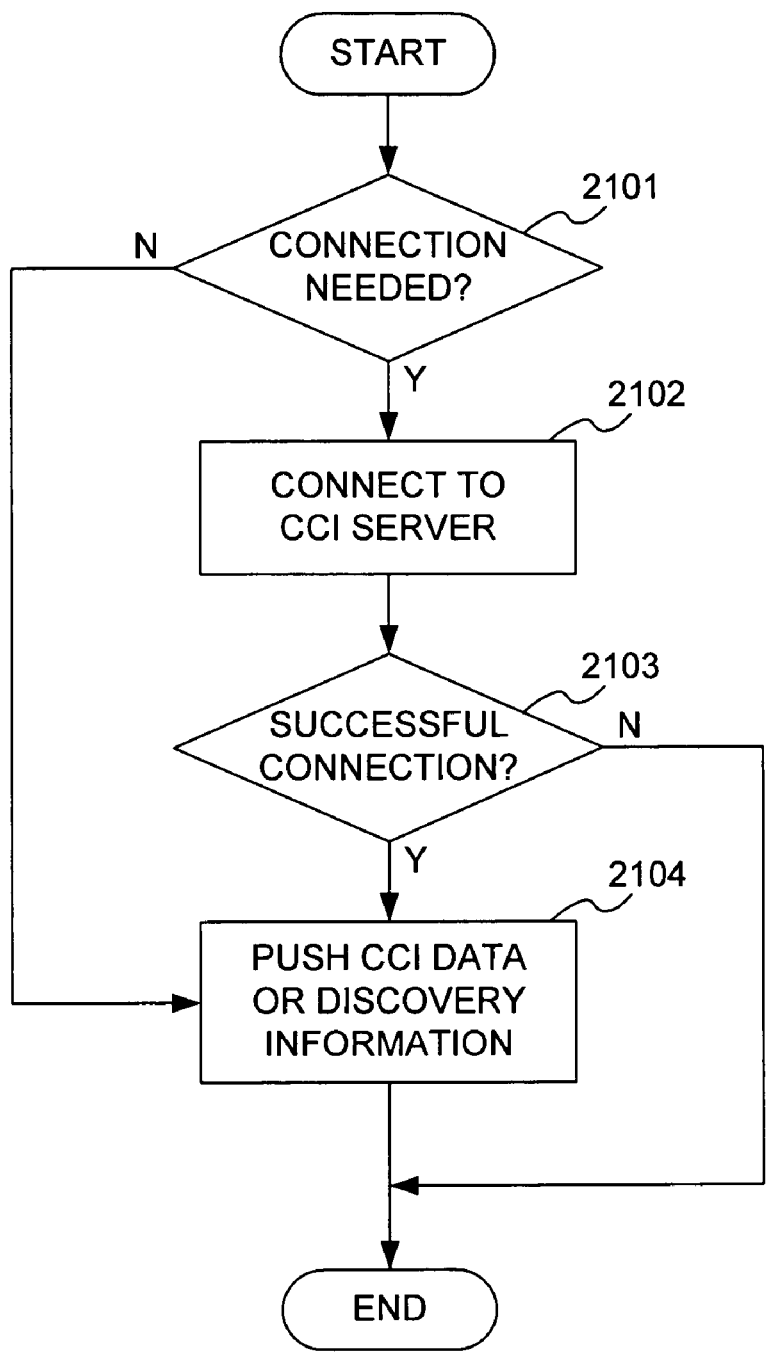
FIG. 21 illustrates a process for issuing a cell coverage information push according to one or more aspects of an embodiment of the invention.

FIG. 21 illustrates a process for issuing a cell coverage information push according to one or more aspects of an embodiment of the invention. At decision 2101, if a connection is needed, the server connection is created at step 2102. If the connection is successful at decision 2103, then at step 2104, the appropriate CCI data and metadata and/or discovery information are sent as a CCI Push. If no connection was needed at decision 2101, then step 2104 assembles the CCI Push in the same fashion. Once the CCI Push is issued, or if the connection attempt failed, control terminates normally.

Should the above methods fail, and mobile terminal 101 is unable to retrieve cell coverage information for a particular geographic location or cell, the terminal can always fall back on prior art methods of making handover decisions, such as measuring the signal strength of all surrounding cells and making a handover decision based on that information.

While aspects of the invention have been described with respect specific examples, including presently preferred modes of carrying out the invention, those skilled in the art will appreciate that there are numerous variations and permutations of the above described systems and techniques that fall within the spirit and scope of the invention as set forth in the appended claims. Aspects of the invention may also be used in other forms of wireless cellular networks, including digital video broadcasting (DVB), and in cellular telephony.

What is claimed is:

1. A method comprising:
storing in a first mobile terminal, and making available for sharing with other mobile terminals in response to a broadcast request, two types of cell coverage information, the cell coverage information including a first type containing point location and signal strength data for a location of the first mobile terminal, and a second type containing a coverage bitmap for a geographic region, said bitmap identifying signal strength ranges using a bit depth of at least two bits per point;
transmitting a request for cell coverage information from a first mobile terminal to a plurality of other mobile terminals, wherein the request comprises an identification of one of said types of cell coverage information and one of a geographic location and a cell identifier; and
receiving a first response to the request at said first mobile terminal, wherein the response comprises a cell coverage map matching said one of said types and identifying signal strengths at a plurality of positions in two dimensions within the identified geographic location or cell.

2. The method of claim 1, further comprising:
determining a destination cell for a handover procedure using the cell coverage map.

3. The method of claim 2, further comprising:
determining that cell coverage information is needed for the one of a geographic location and a cell identifier in order to assist in making a handover decision.

4. The method of claim 3, further comprising:

determining a direction and speed of travel of the first mobile terminal to assist in making a handover decision.

5. The method of claim 1, wherein transmitting the request for cell coverage information comprises using an ad hoc signalling system to transmit the request to a second mobile terminal.

6. The method of claim 1, wherein the cell coverage map relates to cells in a digital unidirectional broadband broadcast system.

7. An apparatus, comprising:
a first mobile terminal memory configured to store cell coverage information comprising a bitmap representation of cell signal strength;
a processor of said first mobile terminal, configured to perform the following:
transmit a cell coverage information request via the transmitter from the first mobile terminal to a plurality of local mobile terminals;
receive cell coverage information from said mobile terminals in response to said request;
combine the received cell coverage information with the stored cell coverage information in the first mobile terminal memory
use the combined cell coverage information for a handover based on the cell coverage information;
receive a subsequent request for cell coverage information from a second mobile terminal;
consult said first mobile terminal memory to determine whether said requested cell coverage information is stored therein;
if the requested cell coverage information is stored therein, transmitting a reply from the first mobile terminal to the second mobile terminal, the reply including the requested cell coverage information;
if the requested cell coverage information is not stored therein, transmitting a reply from the first mobile terminal to the second mobile terminal, the reply including network address and access information for an entity that offers the requested cell coverage information.

8. The apparatus of claim 7, wherein the combined cell coverage information stored in the memory comprises an overlaid bitmap model of signal strengths for a plurality of cells received from a plurality of sources.

9. The apparatus of claim 7, wherein the combined cell coverage information relates to cells in a digital video broadcast system.

10. The apparatus of claim 7, wherein the processor is further configured to record cell coverage information by storing in the memory a longitude, a latitude, and a signal strength of a cell signal at a moment in time.

11. The apparatus of claim 7, wherein the request for cell coverage information comprises one of a geographic location, a cell identifier, and a postal code.

12. The apparatus of claim 7, wherein the memory stores login information for a computer containing cell coverage information.

13. The method of claim 1, wherein said response includes a cell descriptor table.

14. The method of claim 13, wherein said cell descriptor table includes a bit depth value for each of a plurality of locations in a cell.

15. The method of claim 1, wherein said first mobile terminal comprises a cellular telephone, and said transmitting uses a short range wireless communication scheme different from a cellular communication scheme used by said cellular telephone for mobile telephone communications.

16. The method of claim 15, wherein said first response is received at said first mobile terminal via said short range wireless communication scheme.

17. The method of claim 1, wherein said receiving a first response comprises receiving a plurality of responses from a plurality of said other mobile terminals; said method further comprising said mobile terminal combining information from said plurality of responses to form a combined cell coverage map.

18. The apparatus of claim 7, wherein the processor is further configured to examine, before transmitting said cell coverage information request, information broadcast from a cellular base station to identify desired cell coverage information for a cell handover.

19. A computer-readable medium storing a computer program for performing, when executed, the following:
storing in a first mobile terminal two types of cell coverage information, the cell coverage information including a first type containing point location and signal strength data for a location of the first mobile terminal, and a second type containing a coverage bitmap for a geographic region, said bitmap identifying signal strength ranges using a bit depth of at least two bits per point;
transmitting a request for cell coverage information from a first mobile terminal to a plurality of other mobile terminals, wherein the request comprises an identification of one of said types of cell coverage information and one of a geographic location and a cell identifier;
receiving a first response to the request at said first mobile terminal, wherein the response comprises a cell coverage map matching said one of said type and identifying signal strengths at a plurality of positions in two dimensions within the identified geographic location or cell.

20. The computer-readable medium of claim 19, wherein said computer program further causes performance of the following when executed:
determining a destination cell for a handover procedure using the received cell coverage map.

21. The computer-readable medium of claim 20, wherein said computer program further causes performance of the following when executed:
obtaining a direction and speed of travel of a mobile communication device on which said computer program is executing to assist in making a handover decision.

22. The computer-readable medium of claim 19, wherein said computer program further causes performance of the following when executed:
storing a cell descriptor table identifying attributes of a communication cell.

23. The computer-readable medium of claim 22, wherein said cell descriptor table includes a depth value identifying a bit depth of said map.

24. The computer-readable medium of claim 19, wherein said computer program further causes performance of the following when executed:
receiving a cell coverage information request from another mobile communication device;
determining cell coverage information type compatibility between said request and said cell coverage map; and in response to determining said compatibility, transmitting said cell coverage map to said another mobile communication device in response to said request.

25. The computer-readable medium of claim 19, wherein said transmitting uses a local wireless connection.

26. The computer-readable medium of claim 19, wherein said computer program further causes performance of the following when executed:
receiving a plurality of cell coverage information transmissions from a plurality of said other terminals; and
combining information from said plurality of cell coverage information transmissions to form a combined cell coverage bitmap.

27. The method of claim 1, further comprising:
receiving a second response to the request at said first mobile terminal from one of said plurality of other mobile terminals, wherein the second response lacks the requested cell coverage information, but provides an alternate address indicating a network location from which the requested cell coverage information may be obtained; and
said first mobile terminal accessing said network location using said address to obtain the requested cell coverage information.

28. The method of claim 27, wherein said second response further comprises a password corresponding to said address.

29. The method of claim 1, further comprising said first mobile terminal converting said stored second type of cell coverage information into a first type of cell coverage information.

30. The apparatus of claim 7, wherein said first mobile terminal memory is configured to store two types of cell coverage information, including a first type containing point location and signal strength data for a location of the first mobile terminal, and a second type containing a coverage bitmap for a geographic region, said bitmap identifying signal strength ranges using a bit depth of at least two bits per point.

31. The apparatus of claim 7, wherein said access information comprises a password of the network address.

* * * * *